US012037065B2

(12) United States Patent
Seo et al.

(10) Patent No.: US 12,037,065 B2
(45) Date of Patent: Jul. 16, 2024

(54) CATERPILLAR CHANGING APPARATUS

(71) Applicant: HANWHA AEROSPACE CO., LTD., Changwon-si (KR)

(72) Inventors: Min Kyo Seo, Changwon-si (KR); Ki Jeong Kim, Changwon-si (KR); Dong Su Lee, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 630 days.

(21) Appl. No.: 17/229,222

(22) Filed: Apr. 13, 2021

(65) Prior Publication Data

US 2022/0234661 A1   Jul. 28, 2022

(30) Foreign Application Priority Data

Jan. 22, 2021 (KR) .......................... 10-2021-0009095

(51) Int. Cl.
*B62D 55/32* (2006.01)
*B66F 7/26* (2006.01)

(52) U.S. Cl.
CPC ................ *B62D 55/32* (2013.01); *B66F 7/26* (2013.01); *B23P 2700/50* (2013.01)

(58) Field of Classification Search
CPC ........ B23P 19/04; B23P 2700/50; B23Q 1/25; B23Q 1/58; B23Q 1/585; B62B 2203/073; B62B 2203/07; B62D 55/32; B62D 55/244; B66F 7/0641; B66F 7/08; B66F 7/085; B66F 7/10; B66F 7/26; B66F 7/28; Y10T 29/53448
See application file for complete search history.

(56) References Cited

U.S. PATENT DOCUMENTS

| | | | |
|---|---|---|---|
| 6,530,626 B1 | 3/2003 | Benoit et al. | |
| 8,857,924 B2 | 10/2014 | Reshad et al. | |
| 9,981,704 B2* | 5/2018 | Campbell | B62D 55/32 |
| 10,328,538 B2* | 6/2019 | Tsui | B23Q 7/02 |
| 2019/0031258 A1 | 1/2019 | Soik et al. | |
| 2020/0368854 A1* | 11/2020 | Kitamura | B23Q 1/525 |

FOREIGN PATENT DOCUMENTS

| | | |
|---|---|---|
| JP | 2005-153665 A | 6/2006 |
| JP | 2017-197106 A | 11/2017 |
| JP | 2017197106 A * | 11/2017 |
| KR | 10-1433383 B1 | 8/2014 |

OTHER PUBLICATIONS

Communication dated Jun. 6, 2022 issued by the Australian Patent Office in AU Application No. 2021203586.

* cited by examiner

*Primary Examiner* — Tyrone V Hall, Jr.
(74) *Attorney, Agent, or Firm* — Sughrue Mion, PLLC

(57) ABSTRACT

A caterpillar changing apparatus includes a floor frame; a moving fame movable with respect to the floor frame; and a supporting unit including at least one body, the supporting unit provided on the moving frame and configured to support a caterpillar to maintain a shape of the caterpillar that the caterpillar has when installed on a vehicle.

19 Claims, 31 Drawing Sheets

CATERPILLAR CHANGING APPARATUS

This application claims the benefit of Korean Patent Application No. 10-2021-0009095, filed on Jan. 22, 2021, in the Korean Intellectual Property Office, the disclosure of which is incorporated herein by reference in its entirety.

BACKGROUND

1. Field

Embodiments of the present disclosure relate to a caterpillar changing apparatus, and more particularly, to a caterpillar changing apparatus for removing a caterpillar from a vehicle or installing a caterpillar on a vehicle.

2. Description of Related Art

In consideration of the operability and maintainability of rubber caterpillars, rubber caterpillars are being applied to mobile vehicles. Rubber caterpillars have a smaller weight than iron caterpillars and generate less vibration. Further, even if the rubber caterpillar is damaged by an interpersonal mine or the like, damage caused by scattering fragments can be relatively reduced.

On the other hand, in order to change the rubber caterpillar installed on the vehicle, a separate equipment such as a forklift may be used. Since such equipment is not a dedicated equipment for changing the rubber caterpillar, the replacement time and installation risk may vary depending on the work skill level by the operator.

Accordingly, there is a need for the emergence of an invention that makes it possible to remove the rubber caterpillar installed on the vehicle and install a new rubber caterpillar.

SUMMARY

A problem to be solved by embodiments of the present disclosure is to provide a caterpillar changing apparatus for removing a caterpillar from a vehicle or installing a caterpillar on a vehicle.

However, embodiments of the present disclosure are not restricted to those set forth herein. Embodiments of the present disclosure will become more apparent to one of ordinary skill in the art to which the present disclosure pertains by referencing the detailed description of the present disclosure given below.

According to one or more embodiments, a caterpillar changing apparatus is provided. The caterpillar changing apparatus includes: a floor frame; a moving fame movable with respect to the floor frame; and a supporting unit including at least one body, the supporting unit provided on the moving frame and configured to support a caterpillar to maintain a shape of the caterpillar that the caterpillar has when installed on a vehicle.

According to an embodiment, the floor frame includes: a first floor frame including a first rail providing a moving path of the moving frame; and a second floor frame detachable from the first floor frame and including a second rail connected to the first rail to provide the moving path of the moving frame.

According to an embodiment, the floor frame includes: a body frame; a caster provided on the body frame, the caster configured to reduce friction between a ground and the body frame; and a fixing unit including at least one body, the fixing unit configured to fix the body frame to the ground.

According to an embodiment, the moving frame includes: a base frame movably coupled with respect to the floor frame such as to be configured to move in a moving direction; an extension frame extending from the base frame in a direction different from the moving direction of the base frame; and two wing frames rotatably coupled to two opposite side surfaces of the base frame, respectively.

According to an embodiment, the base frame includes a base roller that is configured to reduce friction with the floor frame.

According to an embodiment, the at least one body of the supporting unit includes: an upper supporting unit configured to support an upper portion of the caterpillar; a lower supporting unit configured to support a lower portion of the caterpillar; and a side supporting unit configured to support a side portion of the caterpillar.

According to an embodiment, the upper supporting unit includes: a main supporting unit; and a sub supporting unit couplable or detachably coupled to the main supporting unit in a longitudinal direction of the main supporting unit.

According to an embodiment, the main supporting unit includes: a main bar elongated in a longitudinal direction of the caterpillar; and a plurality of main rods elongated in a same direction as each other, provided at different points of the main bar, and configured to support the upper portion of the caterpillar.

According to an embodiment, the upper supporting unit includes a lug that is configured to be connected to a hook or a wire.

According to an embodiment, the upper supporting unit is coupled to the moving frame so as to be movable in a vertical direction with respect to a ground.

According to an embodiment, the upper supporting unit is coupled to the moving frame so as to be movable in a longitudinal direction of the caterpillar.

According to an embodiment, the upper supporting unit is detachable from the moving frame.

According to an embodiment, the lower supporting unit is coupled to the moving frame so as to be movable in a vertical direction with respect to a ground.

According to an embodiment, the side supporting unit includes: a coupling unit coupled to the moving frame; a posture adjusting unit coupled to the coupling unit and configured to enable posture adjustment of the side supporting unit; and a tension unit provided with the posture adjusting unit and configured to apply pressure to the side portion of the caterpillar in a longitudinal direction of the caterpillar.

According to an embodiment, the tension unit includes: a tension body coupled to the posture adjusting unit; and a plurality of tension rods elongated in a same direction as each other, provided at different points of the tension body, and configured to apply the pressure to the side portion of the caterpillar.

According to an embodiment, the plurality of tension rods are arranged on the tension body with a predetermined curvature so as to correspond to a shape of the side portion of the caterpillar.

According to an embodiment, the tension unit is rotatably coupled to the posture adjusting unit.

According to an embodiment, the at least one body of the supporting unit includes an inclined supporting unit that is configured to support an inclined portion of the caterpillar.

According to an embodiment, the inclined supporting unit includes: a coupling unit coupled to the moving frame; and a main posture adjusting unit coupled to the coupling unit and configured to enable posture adjustment of the inclined supporting unit and support the inclined portion of the caterpillar.

According to an embodiment, the main posture adjusting unit is coupled to the coupling unit such as to enable the posture adjustment, and the inclined supporting unit further includes a sub posture adjusting unit that is configured to support the inclined portion of the caterpillar.

Other features and embodiments of the present disclosure may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
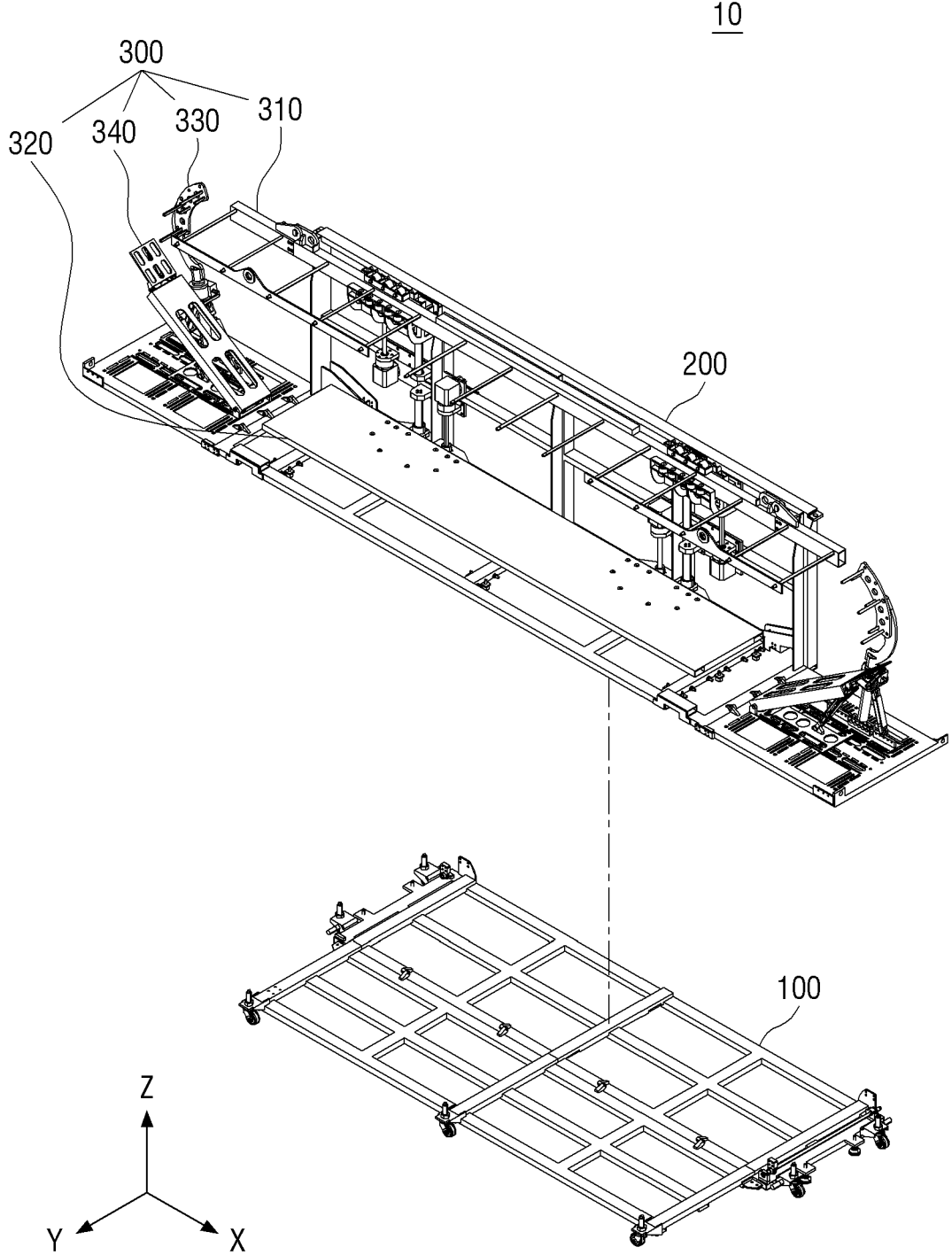
FIG. 1 is a first view showing a caterpillar changing apparatus according to an embodiment of the present disclosure.

Hereinafter, non-limiting example embodiments of the present disclosure will be described in detail with reference to the accompanying drawings. Advantages and features of embodiments of the present disclosure, and methods of achieving them will be apparent with reference to the non-limiting example embodiments described below in detail together with the accompanying drawings. However, embodiments of present disclosure are not limited to the embodiments to be described below, and may be implemented in various different forms, and these embodiments are only provided to make the disclosures of the present disclosure complete, and to fully inform the scope of the disclosure to those of ordinary skill in the technical field to which the present disclosure belongs. The same reference numerals refer to the same components throughout the specification.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

Unless otherwise defined, all terms (including technical and scientific terms) used in the present specification may have meanings that can be commonly understood by those of ordinary skill in the art to which the present disclosure belongs. In addition, terms defined in a commonly used dictionary are not interpreted ideally or excessively unless explicitly defined specifically.

Figure 2:
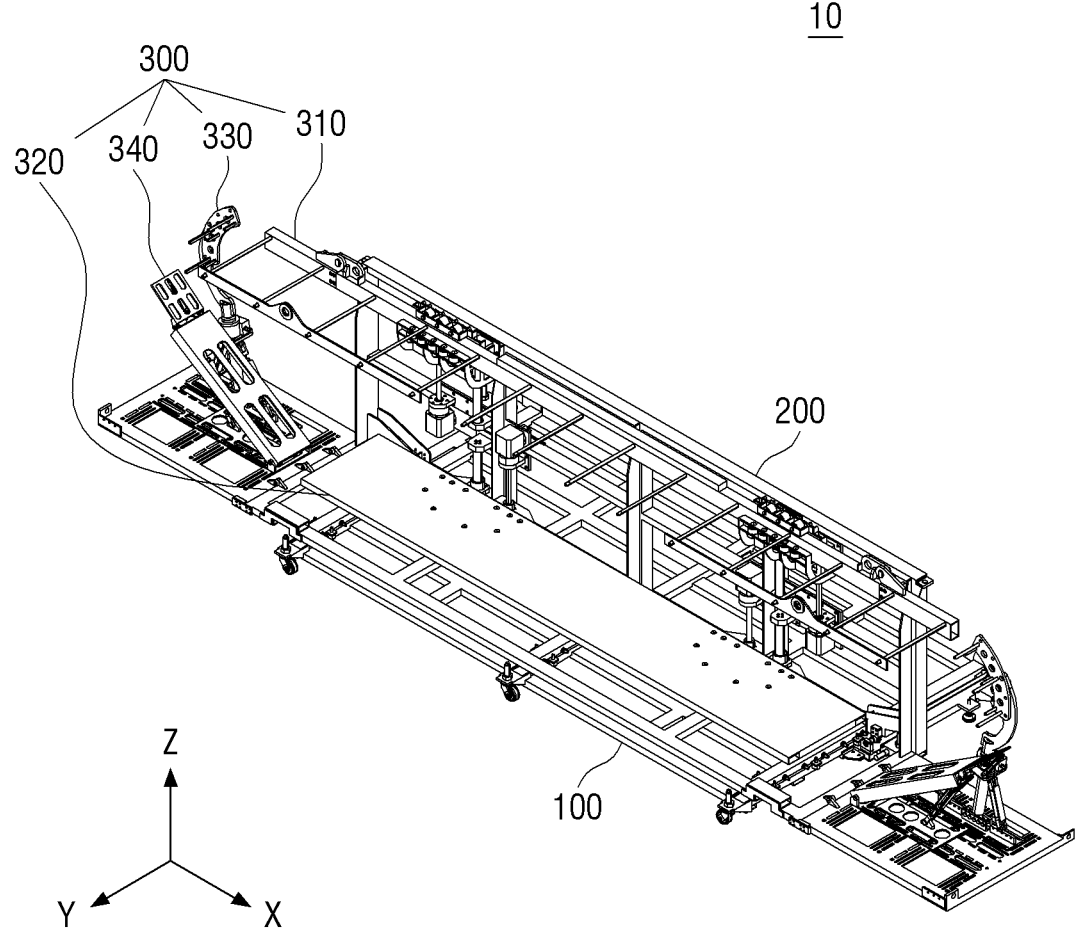
FIG. 2 is a second view showing the caterpillar changing apparatus according to the embodiment of the present disclosure.
Figure 3:
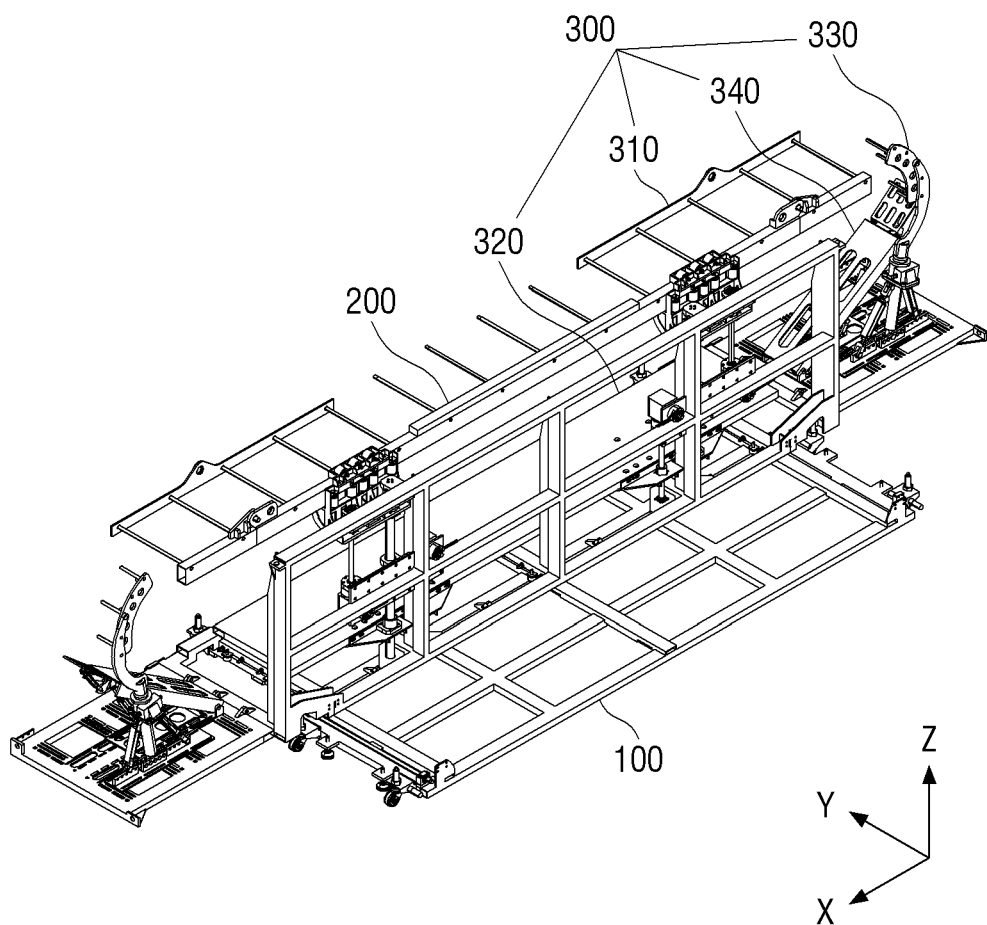
FIG. 3 is a third view showing the caterpillar changing apparatus according to the embodiment of the present disclosure.

FIGS. 1 to 3 are views showing a caterpillar changing apparatus according to an embodiment of the present disclosure.

Referring to FIGS. 1 to 3, the caterpillar changing apparatus 10 according to an embodiment of the present disclosure includes a floor frame 100, a moving frame 200, and a supporting unit 300.

The floor frame 100 may be installed on the ground to support the moving frame 200. The moving frame 200 may move with respect to the floor frame 100. The moving frame 200 may be seated on the floor frame 100 and move linearly along a path provided by the floor frame 100.

The supporting unit 300 may be provided on the moving frame 200 to support the caterpillar. In embodiments of the present disclosure, the caterpillar may be installed on a vehicle or for installation on a vehicle. The supporting unit 300 may support the caterpillar so that the shape of the caterpillar installed on the vehicle is maintained. To this end, the supporting unit 300 may include an upper supporting unit 310, a lower supporting unit 320, a side supporting unit 330, and an inclined supporting unit 340. The upper supporting unit 310 may support the upper portion of the caterpillar, the lower supporting unit 320 may support the lower portion of the caterpillar, the side supporting unit 330 may support the side portion of the caterpillar, and the inclined supporting unit 340 may support the inclined portion of the caterpillar. As the upper supporting unit 310, the lower supporting unit 320, the side supporting unit 330, and the inclined supporting unit 340 support different points of the caterpillar, the shape of the caterpillar can be maintained constant.

The upper supporting unit 310, the lower supporting unit 320, the side supporting unit 330, and the inclined supporting unit 340 may be deformed within a certain range. The upper supporting unit 310, the lower supporting unit 320, the side supporting unit 330, and the inclined supporting unit 340 can be deformed according to the shape of the caterpillar installed on the vehicle, thereby separating the caterpillar from the vehicle or installing the caterpillar on the vehicle can be performed more easily.

In embodiments of the present disclosure, the caterpillar changing apparatus 10 may have a long shape in one direction. Hereinafter, the longitudinal direction of the caterpillar changing apparatus 10 is referred to as a first direction (X), and a direction perpendicular to the first direction (X) and in which the supporting unit 300 is exposed with respect to the moving frame 200 is referred to as a second direction (Y), and a direction perpendicular to the first direction (X) and the second direction (Y) is referred to as a third direction (Z). For example, the first direction (X) and the second direction (Y) may be parallel to the ground, and the third direction (Z) may be perpendicular to the ground.

Figure 4:
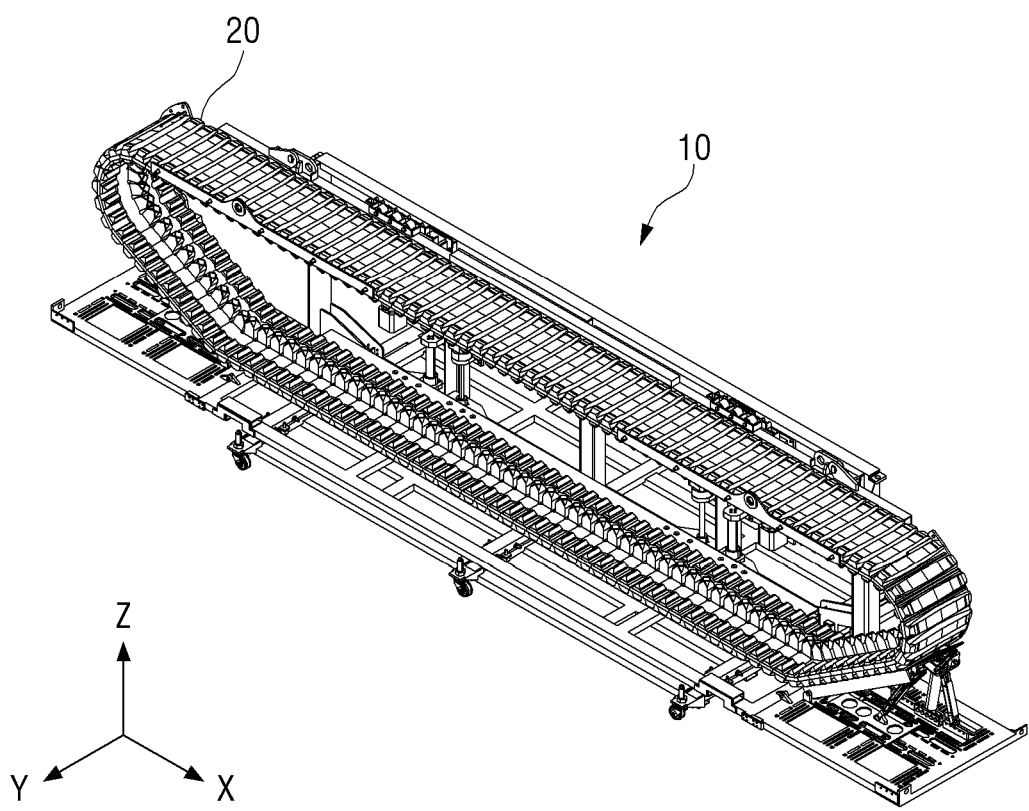
FIG. 4 is a view showing a caterpillar supported by a caterpillar changing apparatus.
Figure 5:
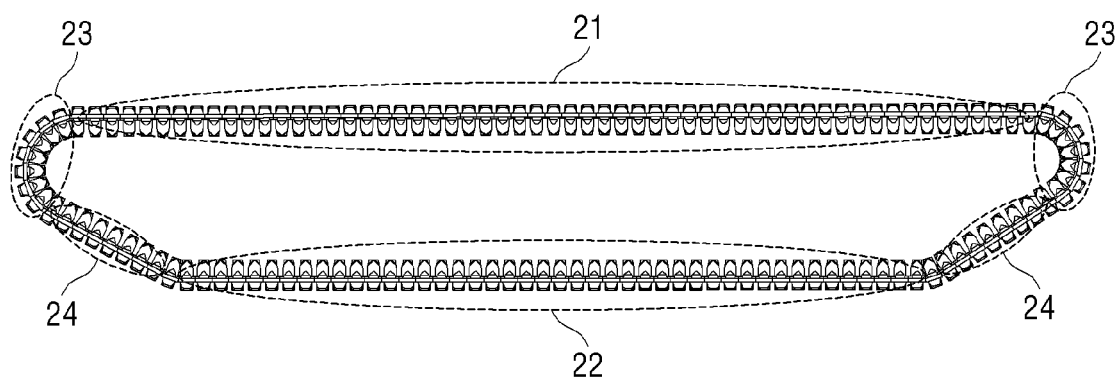
FIG. 5 is a view for describing the caterpillar shown in FIG. 4.

FIG. 4 is a view for describing that the caterpillar is supported by the caterpillar changing apparatus, and FIG. 5 is a view for describing the caterpillar shown in FIG. 4.

Referring to FIG. 4, the caterpillar changing apparatus 10 may support the caterpillar 20.

In embodiments of the present disclosure, the caterpillar 20 may be a rubber caterpillar, but the caterpillar 20 is not limited to the rubber caterpillar.

The caterpillar changing apparatus 10 may support the caterpillar 20 while maintaining the caterpillar 20 in a certain shape. The shape of the caterpillar 20 supported by the caterpillar changing apparatus 10 may be the same as or similar to the shape of the caterpillar 20 installed on the vehicle.

Referring to FIG. 5, the caterpillar 20 may include a plurality of portions.

Hereinafter, the upper portion of the caterpillar 20 is referred to as the caterpillar upper portion 21, the lower portion of the caterpillar 20 is referred to as the caterpillar lower portion 22, both edge portions of the caterpillar 20 are referred to as the caterpillar side portion 23, and a portion inclined with respect to the ground at both edges of the caterpillar 20 is referred to as the caterpillar inclined portion 24.

Figure 6:
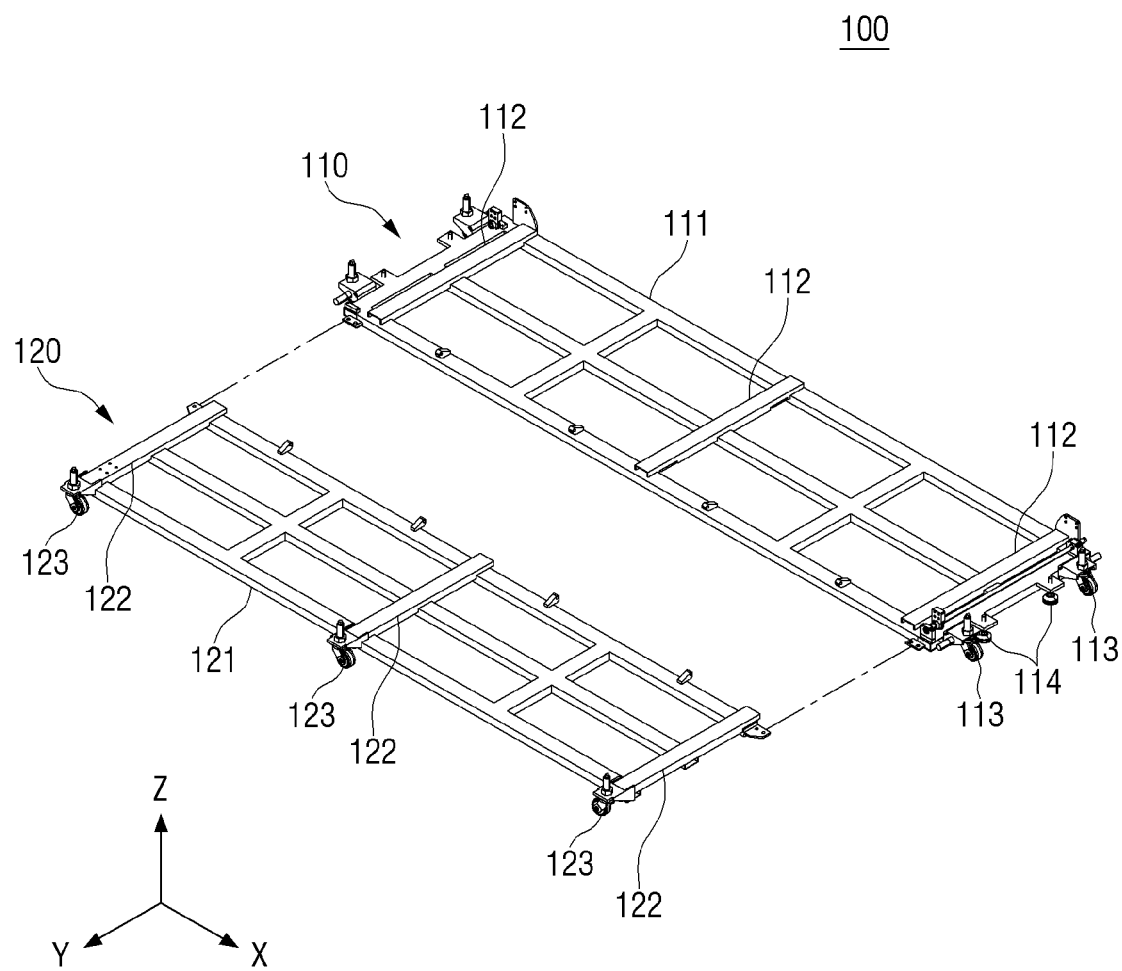
FIG. 6 is a perspective view of a floor frame according to an embodiment of the present disclosure.
Figure 7:
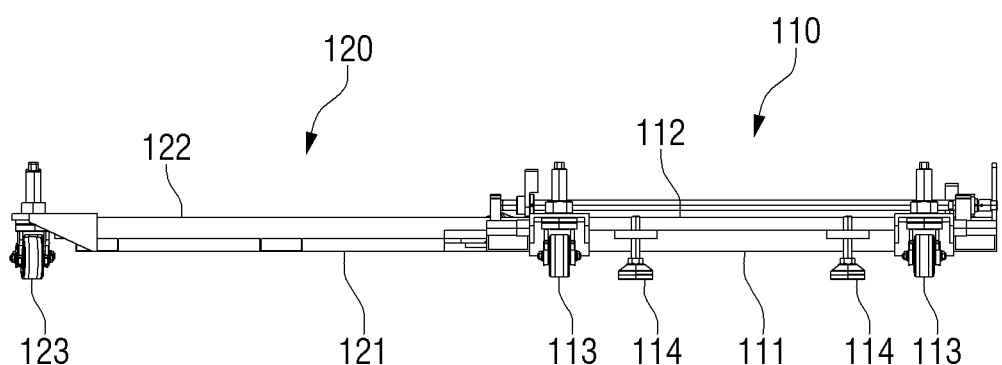
FIG. 7 is a side view of the floor frame according to the embodiment of the present disclosure.
Figure 7:
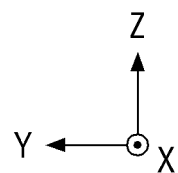

FIGS. 6 and 7 are views for describing a floor frame.

Referring to FIGS. 6 and 7, the floor frame 100 may include a first floor frame 110 and a second floor frame 120.

The first floor frame 110 may include a first rail 112 providing a moving path of the moving frame 200. The second floor frame 120 may include a second rail 122 providing a moving path of the moving frame 200. The first rail 112 and the second rail 122 may be formed to be elongated in the moving direction of the moving frame 200.

The second floor frame 120 may be detachable from the first floor frame 110. When the second floor frame 120 is attached to the first floor frame 110, the second rail 122 may be connected to the first rail 112. The first rail 112 and the second rail 122 may be connected to each other to provide a moving path of the moving frame 200. That is, the moving frame 200 may move along the first rail 112 and then move along the second rail 122, or move along the second rail 122 and then move along the first rail 112.

The floor frame 100 may include body frames. Each of the first floor frame 110 and the second floor frame 120 may include body frames. Hereinafter, the body frame provided in the first floor frame 110 is referred to as a first body frame 111, and the body frame provided in the second floor frame 120 is referred to as a second body frame 121.

The first rail 112 described above may be provided on the first body frame 111, and the second rail 122 may be provided on the second body frame 121. As the first body frame 111 and the second body frame 121 are coupled to each other, the first rail 112 and the second rail 122 may be connected.

The floor frame 100 may include casters 113 and 123 and a fixing unit 114. The casters 113 and 123 are provided on the first body frame 111 and the second body frame 121, respectively, and serve to reduce friction between the ground and the first body frame 111 and the second body frame 121. The user can move the caterpillar changing apparatus 10 on the ground by using the casters 113 and 123 provided on the floor frame 100.

The fixing unit 114 serves to fix the first body frame 111 and the second body framer 121 to the ground. For example, the fixing unit 114 may be screwed to the first body frame 111 and the second body frame 121. The length of the fixing unit 114 exposed from the first body frame 111 and the second body frame 121 may vary according to the rotation of the fixing unit 114 with respect to the first body frame 111 and the second body frame 121. The first body frame 111 and the second body frame 121 are supported by the fixing unit 114 and may be arranged in a state spaced apart from the ground by a predetermined distance. When the fixing unit 114 rotates and its lower end is lower than the casters 113 and 123, the first body frame 111 and the second body frame 121 can be fixed to the ground through the fixing unit 114.

Figure 8:
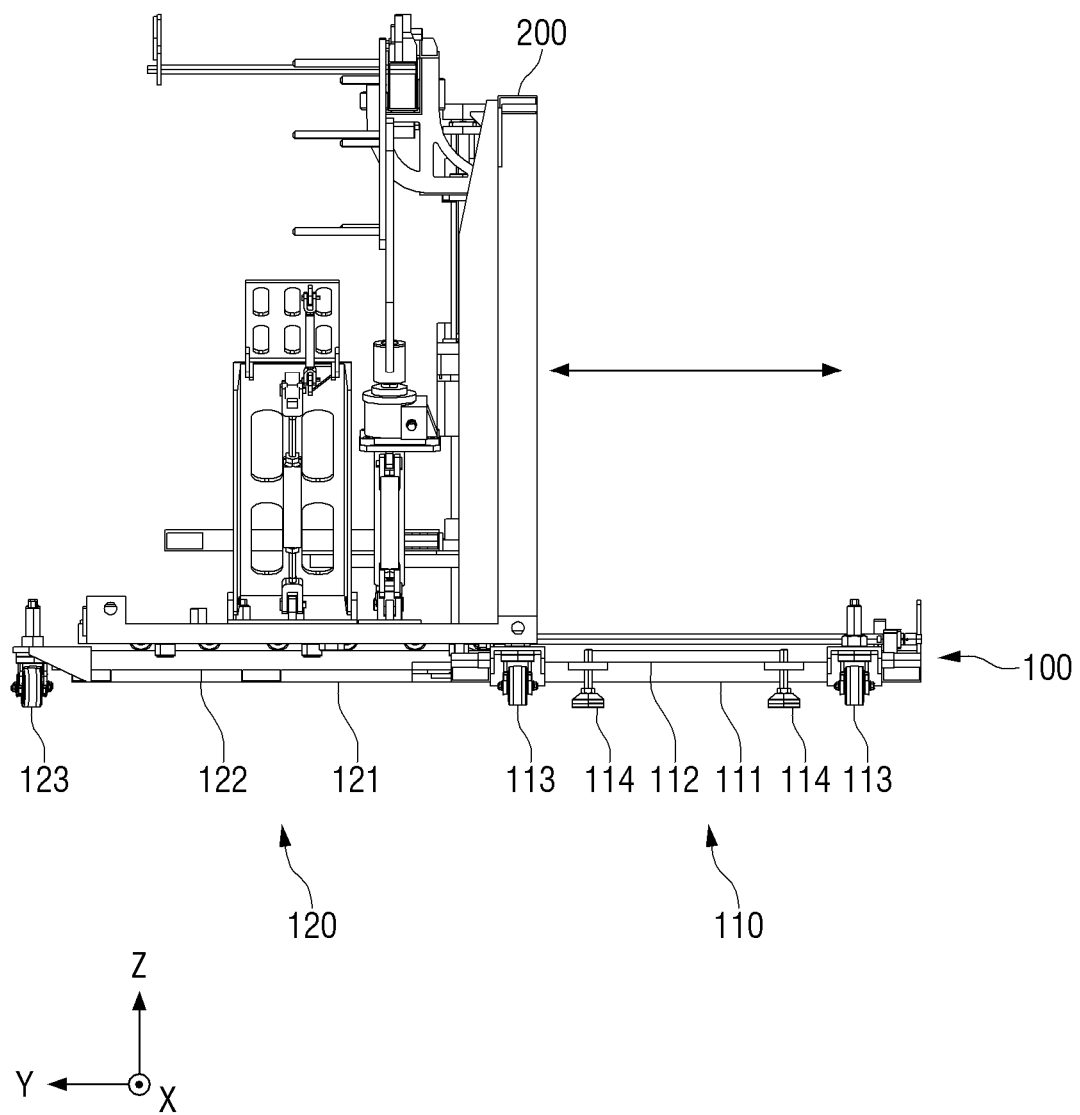
FIG. 8 is a view for describing that a moving frame moves with respect to the floor frame.

FIG. 8 is a view for describing that the moving frame moves with respect to the floor frame.

Referring to FIG. 8, the moving frame 200 may move with respect to the floor frame 100.

As described above, the floor frame 100 may include a rail providing a moving path of the moving frame 200. The moving frame 200 may move along a moving path provided by the rail. As the moving frame 200 moves, the supporting unit 300 provided in the moving frame 200 may also move together.

In embodiments of the present disclosure, the moving path of the moving frame 200 relative to the floor frame 100 may be a straight line. For example, the moving frame 200 may linearly move in a direction parallel to the second direction (Y). On the other hand, it is an example that the moving path of the moving frame 200 relative to the floor frame 100 is a straight line, and according to some embodiments of the present disclosure, the moving path of the moving frame 200 relative to the floor frame 100 may be a curved line, and may be a combination of a straight line and a curved line. Hereinafter, it will be described mainly that the moving path of the moving frame 200 relative to the floor frame 100 is a straight line.

Figure 9:
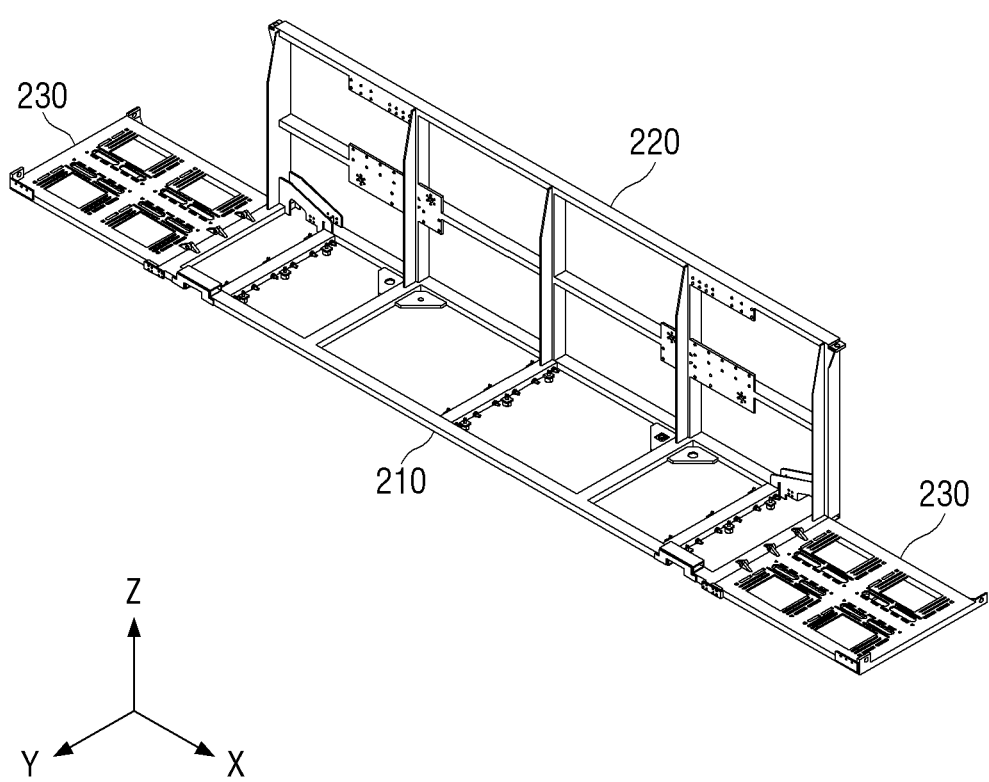
FIG. 9 is a perspective view of a moving frame according to an embodiment of the present disclosure.
Figure 10:
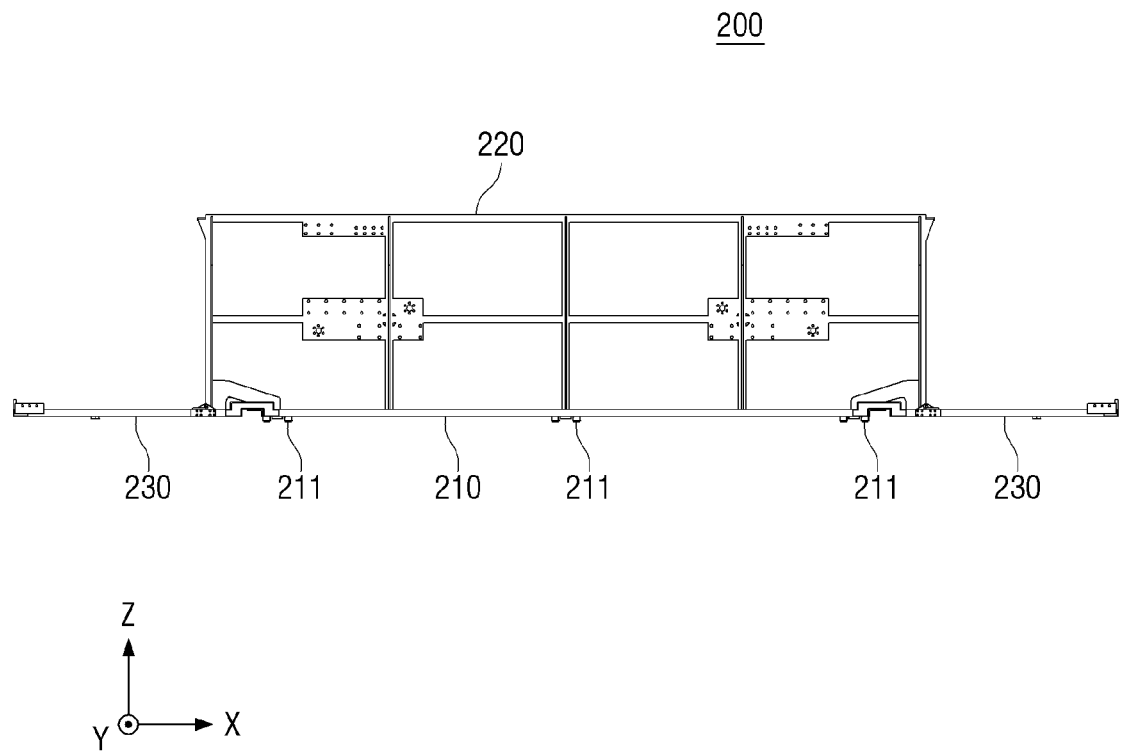
FIG. 10 is a side view of the moving frame with a base roller according to the embodiment of the present disclosure.
Figure 11:
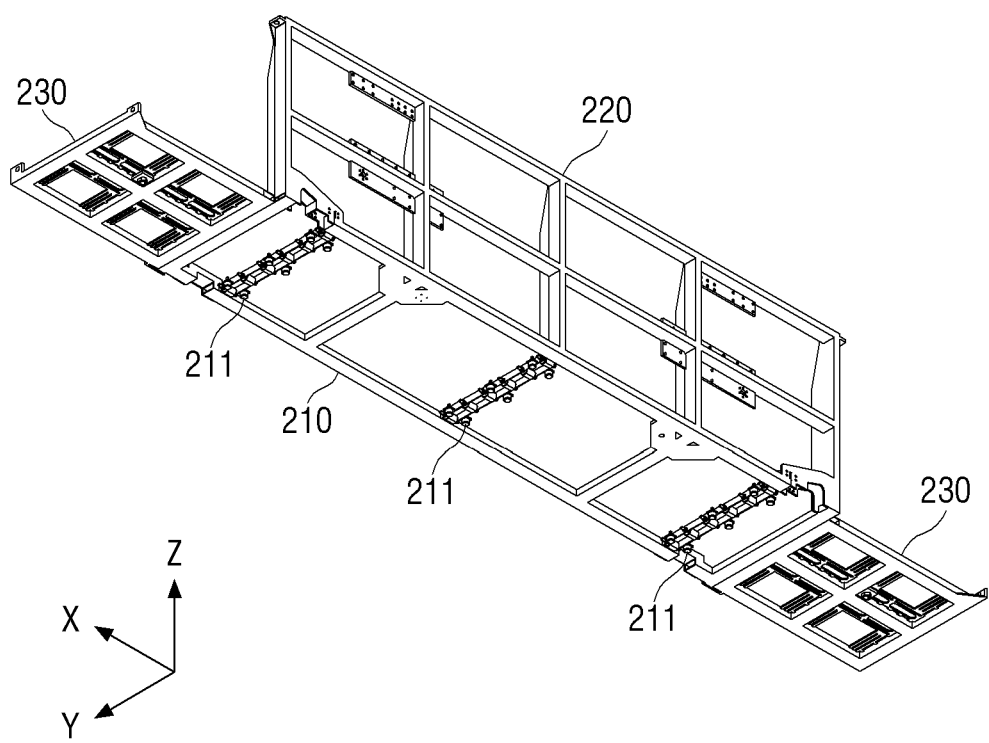
FIG. 11 is a perspective view of the moving frame with the base roller according to the embodiment of the present disclosure.

FIGS. 9 to 11 are views for describing a moving frame.

Referring to FIGS. 9 to 11, the moving frame 200 includes a base frame 210, an extension frame 220, and a wing frame 230.

The base frame 210 may be coupled to be movable with respect to the floor frame 100. Specifically, the base frame 210 may move along the rail of the floor frame 100.

The extension frame 220 may be extended from the base frame 210 in a direction different from the moving direction of the base frame 210. For example, the extension frame 220 may be extended in a direction parallel to the third direction (Z) from the base frame 210.

The wing frame 230 may be rotatably coupled to two opposite side surfaces of the base frame 210. Referring to FIG. 10, the wing frame 230 rotates with respect to the base frame 210 to be erected with respect to the ground or may be arranged parallel to the ground.

When the wing frame 230 is erected with respect to the ground, the wing frame 230 may be coupled to the extension frame 220. In this case, the moving frame 200 may have a hexahedral shape as a whole, and the caterpillar changing apparatus 10 may be transported or stored with the moving frame 200 having this shape.

Referring to FIGS. 10 and 11, the base frame 210 may include a base roller 211 for reducing friction with the floor frame 100.

The base roller 211 may be arranged at a position corresponding to the rail provided in the floor frame 100. Since the base roller 211 is used, the movement of the moving frame 200 relative to the floor frame 100 may be performed more easily. For example, the user may apply a force to the moving frame 200 to move the moving frame 200 with respect to the floor frame 100.

Figure 12:
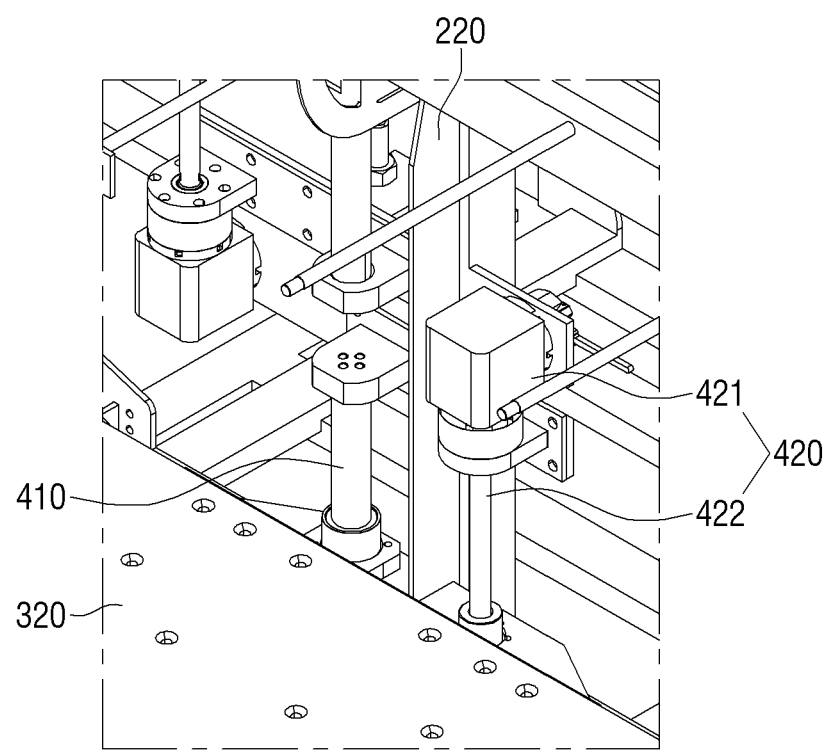
FIG. 12 is a first view for describing movement of the lower supporting unit with respect to the moving frame.
Figure 13:
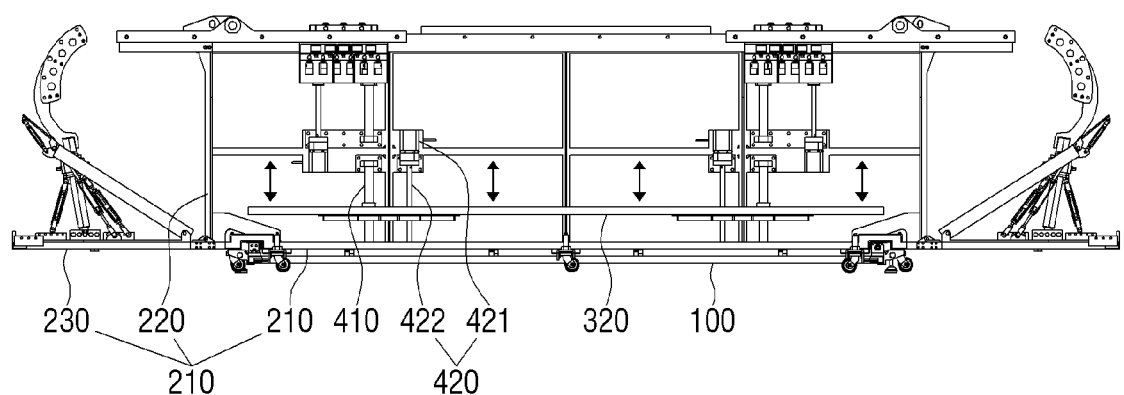
FIG. 13 is a second view for describing the movement of the lower supporting unit with respect to the moving frame.
Figure 13:
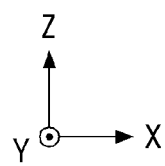

FIGS. 12 and 13 are views for describing the movement of the lower supporting unit with respect to the moving frame.

Referring to FIG. 12, the moving frame 200 may be provided with a first moving guide 410 and a first power transmission unit 420 for moving the lower supporting unit 320. Specifically, a first moving guide 410 and a first power transmission unit 420 may be provided on the extension frame 220 of the moving frame 200.

The first moving guide 410 may provide a moving path of the lower supporting unit 320. The lower supporting unit 320 may move vertically with respect to the ground along the first moving guide 410. The first power transmission unit 420 serves to transmit power to the lower supporting unit 320.

The user may input power to the first power transmission unit 420 by magnetic force or by using a separate power device (not shown). The first power transmission unit 420 may transmit the input power to the lower supporting unit 320.

The first power transmission unit 420 is configured to include a first power transmission body 421 and a first power transmission rod 422. The first power transmission body 421 may rotate the first power transmission rod 422 with power input from a user.

The first power transmission rod 422 may be screwed to the lower supporting unit 320. As the first power transmission rod 422 rotates, a force for moving vertically with respect to the ground may be transmitted to the lower supporting unit 320.

Referring to FIG. 13, the lower supporting unit 320 may be coupled to the moving frame 200 so as to be movable in a vertical direction with respect to the ground.

The lower supporting unit 320 may move vertically with respect to the ground by the first moving guide 410 and the first power transmission unit 420 provided in the moving frame 200.

As the force input by the user is transmitted to the lower supporting unit 320 by the first power transmission unit 420, the lower supporting unit 320 may move upward or downward direction with respect to the moving frame 200. The user may adjust the position of the lower supporting unit 320 in consideration of the position of the caterpillar lower portion 22 of the caterpillar 20 to be supported.

Figure 14:
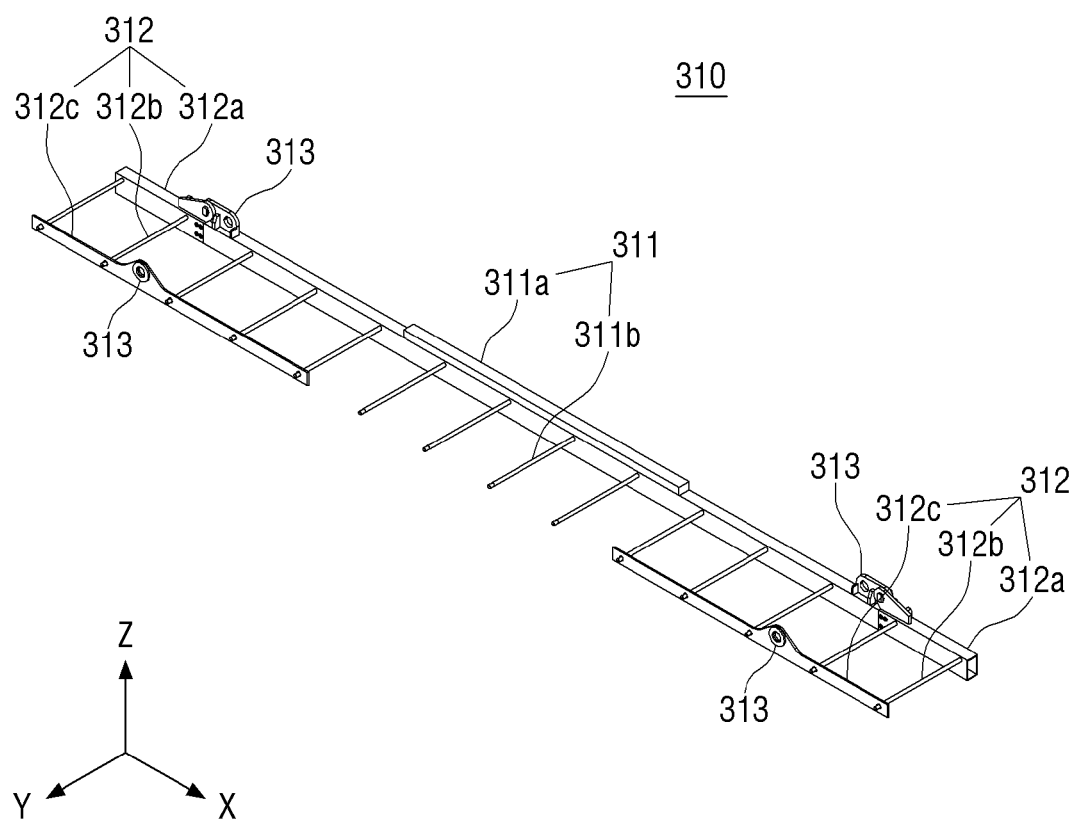
FIG. 14 is a perspective view of an upper supporting unit according to an embodiment of the present disclosure.
Figure 15:
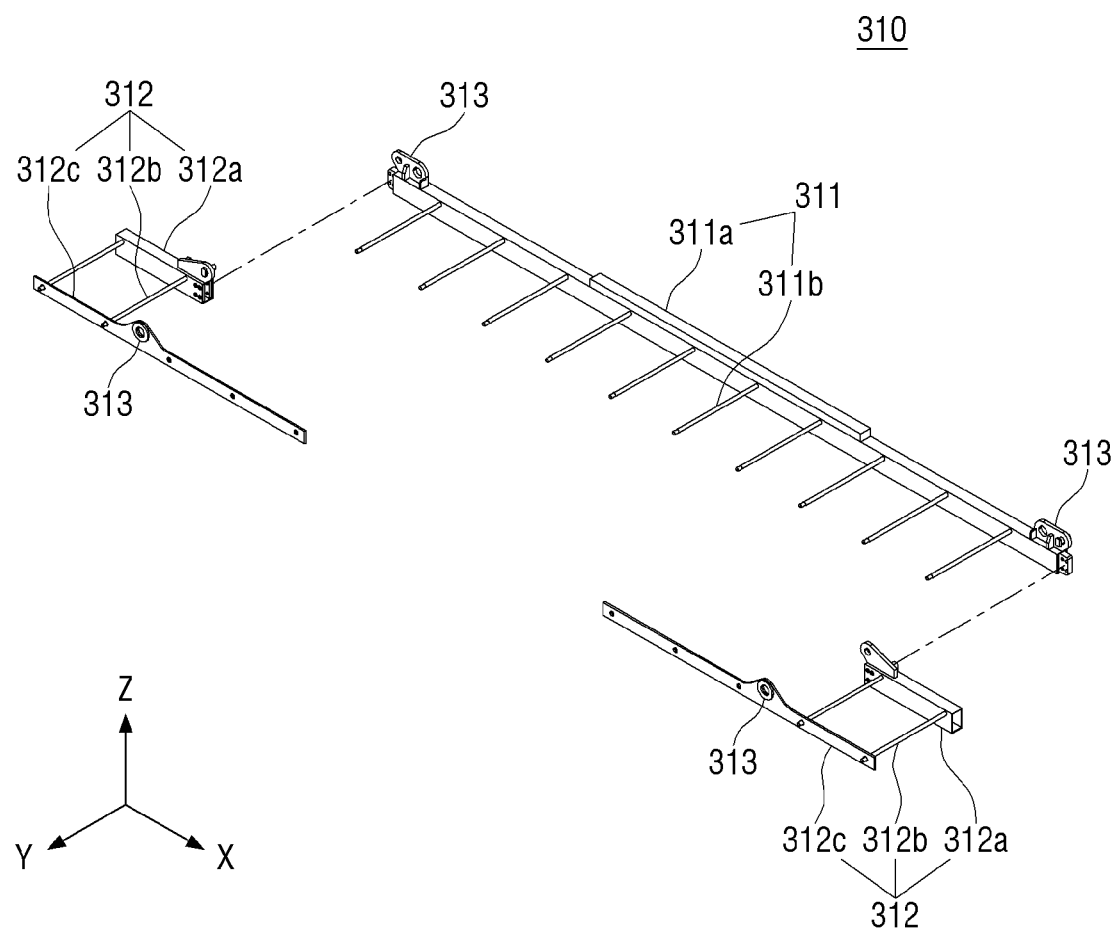
FIG. 15 is a perspective, exploded view of the upper supporting unit according to the embodiment of the present disclosure.

FIGS. 14 and 15 are views for describing an upper supporting unit.

Referring to FIGS. 14 and 15, the upper supporting unit 310 includes a main supporting unit 311 and a sub supporting unit 312.

The main supporting unit 311 includes a main bar 311a and a main rod 311b. The main bar 311a may be formed to be elongated in the longitudinal direction of the caterpillar 20, that is, in the first direction (X). A plurality of the main rod 311b may be provided. The plurality of the main rod 311b may be formed to be elongated in the same direction at different points of the main bar 311a to support the caterpillar upper portion 21 of the caterpillar 20.

The sub supporting unit 312 may be coupled to the main supporting unit 311 in the longitudinal direction of the main supporting unit 311 or may be separated from the main supporting unit 311. The length of the upper supporting unit 310 may be extended as the sub supporting unit 312 is coupled to the main supporting unit 311, and the length of the upper supporting unit 310 may be shortened as the sub supporting unit 312 is separated from the main supporting unit 311.

The sub supporting unit 312 includes a sub bar 312a, a sub rod 312b, and a separation preventing unit 312c. The sub bar 312a may be formed to be elongated in the longitudinal direction of the caterpillar 20, that is, the first direction (X). At least one sub rod 312b may be provided. At least one sub rod 312b may be formed to be elongated in the same direction at different points of the sub bar 312a to support the caterpillar upper portion 21 of the caterpillar 20.

The separation preventing unit 312c may prevent the caterpillar 20 from being separated from the upper supporting unit 310. As the separation preventing unit 312c is coupled to the sub rod 312b, the caterpillar 20 may be prevented from being separated from the upper supporting unit 310. In order to prevent separation of the caterpillar 20, a step may be formed between the sub rod 312b and the separation preventing unit 312c.

The upper supporting unit 310 may include a lug 313 capable of connecting a hook or wire. For example, the lug 313 may be provided on the main bar 311a and the separation preventing unit 312c. As described later, the caterpillar 20 may be supported by the upper supporting unit 310 and lifted. A plurality of the lug 313 arranged at different points are used so that the upper supporting unit 310 is lifted, thereby enabling the stable lifting of the caterpillar 20.

Figure 16:
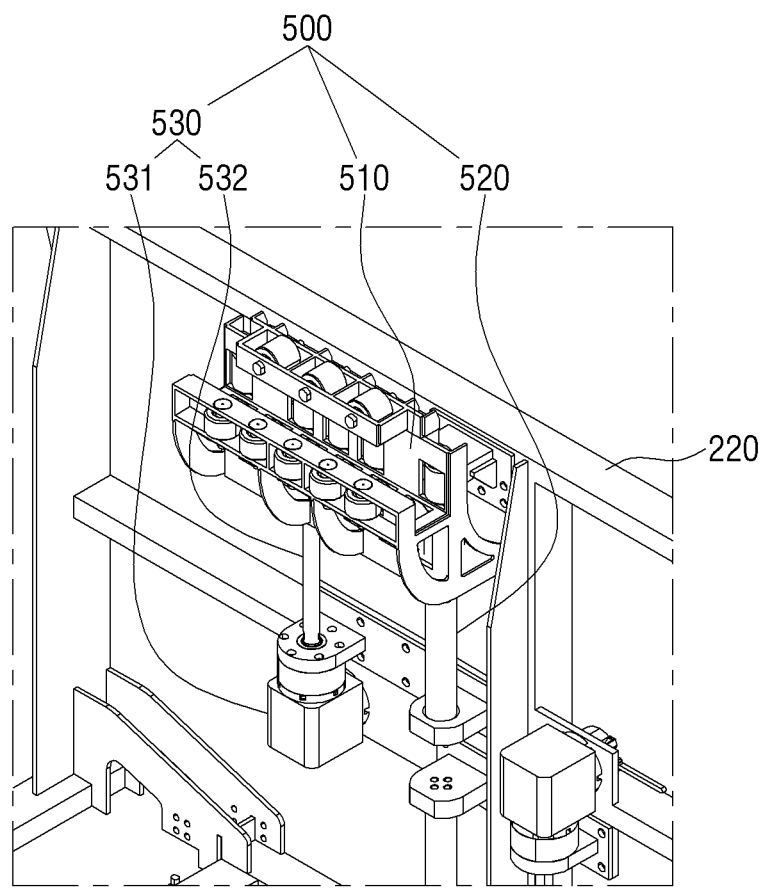
FIG. 16 is a perspective view of a moving supporting unit according to an embodiment of the present disclosure.
Figure 17:
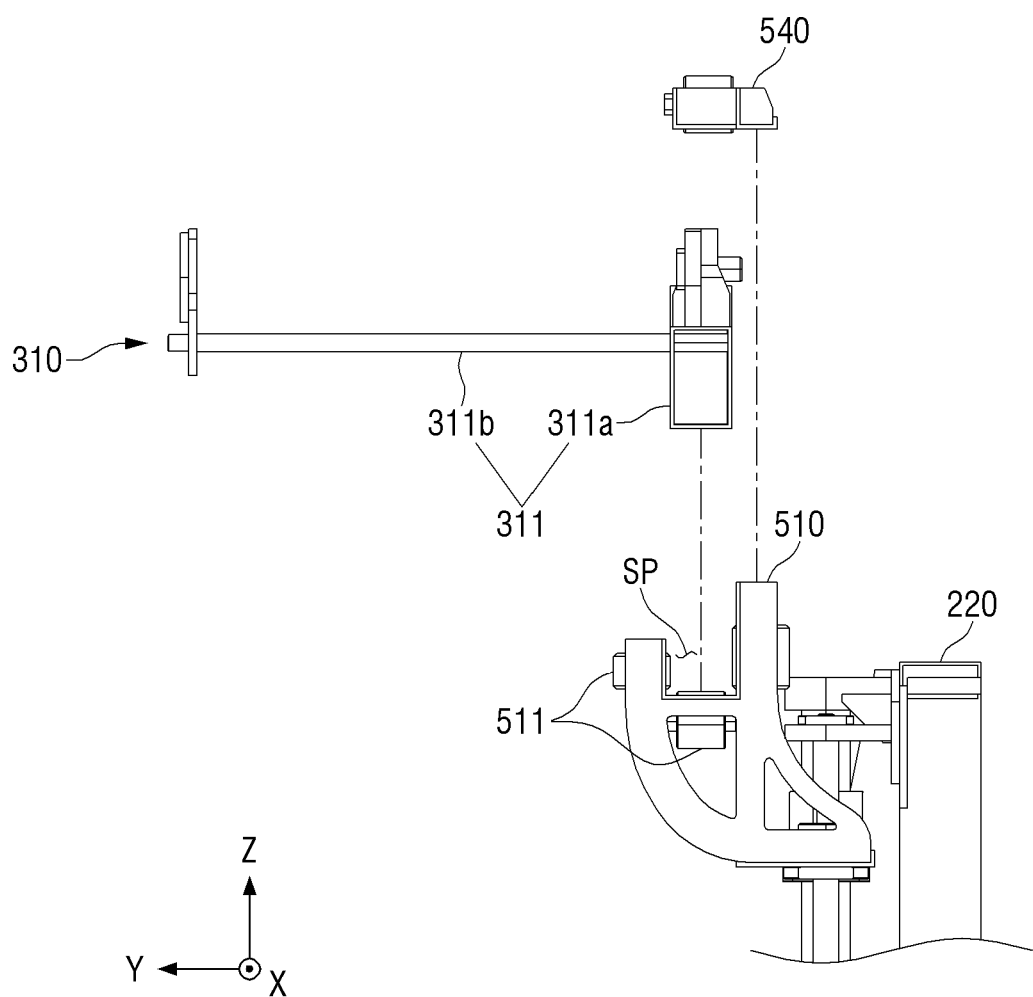
FIG. 17 is a view for describing a coupling relationship between the upper supporting unit and the moving supporting unit.

FIG. 16 is a view for describing the moving supporting unit, and FIG. 17 is a view for describing the coupling relationship between the upper supporting unit and the moving supporting unit.

Referring to FIG. 16, the moving frame 200 may be provided with a moving supporting unit 500 for the movement of the upper supporting unit 310. Specifically, the moving supporting unit 500 may be provided on the extension frame 220 of the moving frame 200.

The moving supporting unit 500 includes a moving body 510, a second moving guide 520, and a second power transmission unit 530.

The moving body 510 may directly contact the upper supporting unit 310 to support the upper supporting unit 310. Specifically, the moving body 510 may support the main supporting unit 311 of the upper supporting unit 310.

The second moving guide 520 may provide a moving path of the moving body 510. The moving body 510 may move vertically with respect to the ground along the second moving guide 520. The second power transmission unit 530 serves to transmit power to the moving body 510.

The user may input power to the second power transmission unit 530 by magnetic force or by using a separate power device (not shown). The second power transmission unit 530 may transmit the input power to the moving body 510.

The second power transmission unit 530 is configured to include a second power transmission body 531 and a second power transmission rod 532. The second power transmission body 531 may rotate the second power transmission rod 532 with power input from a user.

The second power transmission rod 532 may be screwed to the moving body 510.

As the second power transmission rod 532 rotates, a force for moving vertically with respect to the ground may be transmitted to the moving body 510.

Referring to FIG. 17, the upper supporting unit 310 may be supported by the moving body 510.

The moving body 510 may include a recessed space (SP) that is recessed from the top to the bottom. As the main bar 311a of the upper supporting unit 310 is inserted into the recessed space (SP), the upper supporting unit 310 may be supported on the moving body 510. Further, a separation preventing body 540 for preventing the main bar 311a from being separated from the recessed space (SP) may be coupled to the moving body 510. After the main bar 311a is inserted into the recessed space (SP), as the separation preventing body 540 is coupled to the moving body 510, the main bar 311a is prevented from being separated from the moving body 510, and the upper supporting unit 310 may be stably supported on the moving body 510.

The upper supporting unit 310 may move in a vertical direction with respect to the ground. As the moving body 510 moves in the vertical direction with respect to the ground, the upper supporting unit 310 supported on the moving body 510 may move in the vertical direction with respect to the ground.

The upper supporting unit 310 can move with respect to the moving body 510. The moving body 510 may include a moving roller 511 that reduces friction with the upper supporting unit 310. The moving roller 511 may be used so that the upper supporting unit 310 can be moved more easily with respect to the moving body 510. For example, the user may apply a force to the upper supporting unit 310 to move the upper supporting unit 310 with respect to the moving body 510. The moving direction of the upper supporting unit 310 with respect to the moving body 510 may be a longitudinal direction of the caterpillar 20, that is, a direction parallel to the first direction (X).

When the user separates the caterpillar 20 from the vehicle or installs the caterpillar 20 on the vehicle, the user may deform the caterpillar 20 by moving the upper supporting unit 310 with respect to the moving body 510. Accordingly, separating the caterpillar 20 from the vehicle or installing the caterpillar 20 on the vehicle can be performed more easily.

In embodiments of the present disclosure, the upper supporting unit 310 may be separated from the moving frame 200. It is possible to separate the upper supporting unit 310 from the moving frame 200 by removing the separation preventing body 540 from the moving body 510 and pulling the upper supporting unit 310 upward.

Figure 18:
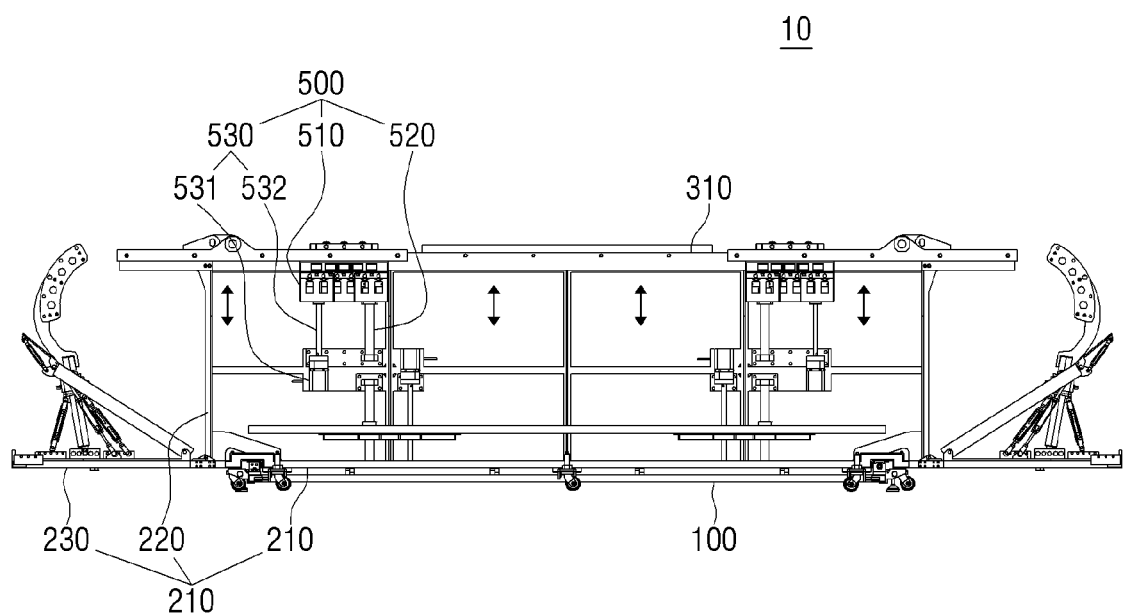
FIG. 18 is a first view for describing movement of an upper supporting unit with respect to a moving frame.
Figure 19:
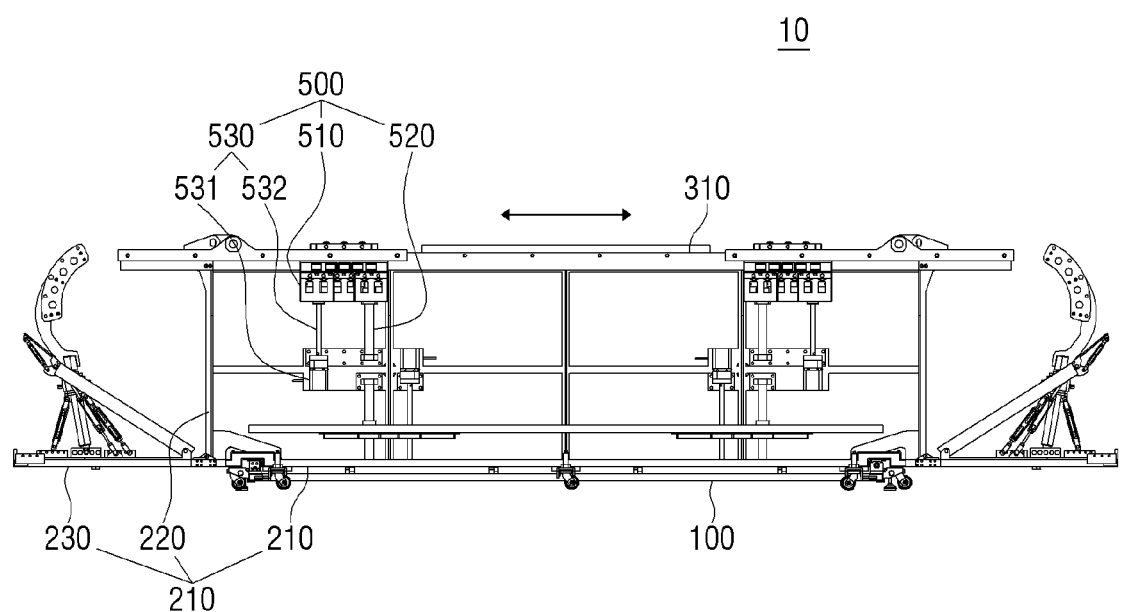
FIG. 19 is a second view for describing movement of the upper supporting unit with respect to the moving frame.

FIGS. 18 and 19 are views for describing the movement of an upper supporting unit with respect to the moving frame.

Referring to FIG. 18, the upper supporting unit 310 may be coupled to the moving frame 200 so as to be movable in the vertical direction with respect to the ground.

The upper supporting unit 310 may move vertically with respect to the ground by the moving body 510, the second moving guide 520, and the second power transmission unit 530 provided in the moving frame 200.

As the force input by the user is transmitted to the moving body 510 by the second power transmission unit 530, the upper supporting unit 310 may move in an upward or downward direction with respect to the ground with the moving body 510. The user may adjust the position of the upper supporting unit 310 in consideration of the position of the caterpillar upper portion 21 of the caterpillar 20 to be supported.

Referring to FIG. 19, the upper supporting unit 310 may be coupled to the moving frame 200 so as to be movable in the longitudinal direction of the caterpillar 20.

The user may input power to the upper supporting unit 310 by magnetic force or by using a separate power device (not shown). The upper supporting unit 310 may move in the longitudinal direction of the caterpillar 20 while being supported by the moving body 510 by the power input to the upper supporting unit 310. The user may adjust the position of the upper supporting unit 310 in consideration of the shape of the caterpillar upper portion 21 of the caterpillar 20 to be supported.

Figure 20:
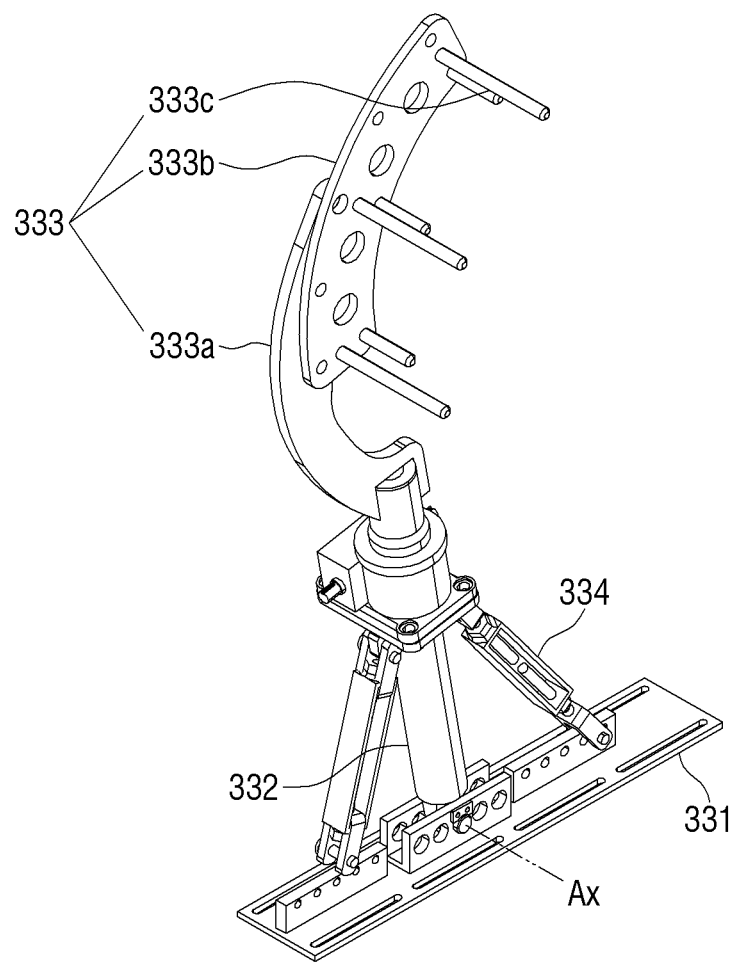
FIG. 20 is a perspective view of a side supporting unit according to an embodiment of the present disclosure.

FIG. 20 is a view for describing a side supporting unit.

Referring to FIG. 20, the side supporting unit 330 includes a coupling unit 331, a posture adjusting unit 332, and a tension unit 333.

The coupling unit 331 may be coupled to the moving frame 200. Specifically, the coupling unit 331 may be coupled to the wing frame 230 of the moving frame 200. The user may couple the coupling unit 331 to an appropriate position of the wing frame 230 in consideration of the shape of the caterpillar 20.

The posture adjusting unit 332 may be coupled to the coupling unit 331 to enable the posture adjustment. For example, the posture adjusting unit 332 may be rotatably coupled to the coupling unit 331. The posture adjusting unit 332 may rotate with respect to the coupling unit 331 based on the rotation axis (Ax) to adjust the posture with respect to the coupling unit 331.

In order to fix the posture of the posture adjusting unit 332 with respect to the coupling unit 331, a posture fixing means 334 may be provided between the coupling unit 331 and the posture adjusting unit 332. For example, the posture fixing means 334 may be a turnbuckle, but the posture fixing means 334 of the present disclosure is not limited to the turnbuckle.

The tension unit 333 is provided in the posture adjusting unit 332 and serves to apply pressure to the caterpillar side portion 23 of the caterpillar 20 in the longitudinal direction of the caterpillar 20. The tension unit 333 includes tension bodies (e.g. a first tension body 333a and a second tension body 333b) and a tension rod 333c. The tension bodies may be coupled to the posture adjusting unit 332. A plurality of the tension rod 333c may be provided. The plurality of the tension rod 333c are formed to be elongated in the same direction at different points of the tension bodies to apply pressure to the caterpillar side portion 23 of the caterpillar 20. As the posture of the posture adjusting unit 332 with respect to the coupling unit 331 is adjusted, the position of the tension unit 333 is moved, and the tension rod 333c can apply pressure to the caterpillar side portion 23 of the caterpillar 20.

The tension bodies may include a first tension body 333a and a second tension body 333b. The first tension body 333a may be coupled to the posture adjusting unit 332. The second tension body 333b may include a tension rod 333c. The second tension body 333b may be detachable from the first tension body 333a. Depending on the shape of the caterpillar 20, the user may couple the second tension body 333b in which the tension rod 333c is arranged in different shapes to the first tension body 333a.

Figure 21:
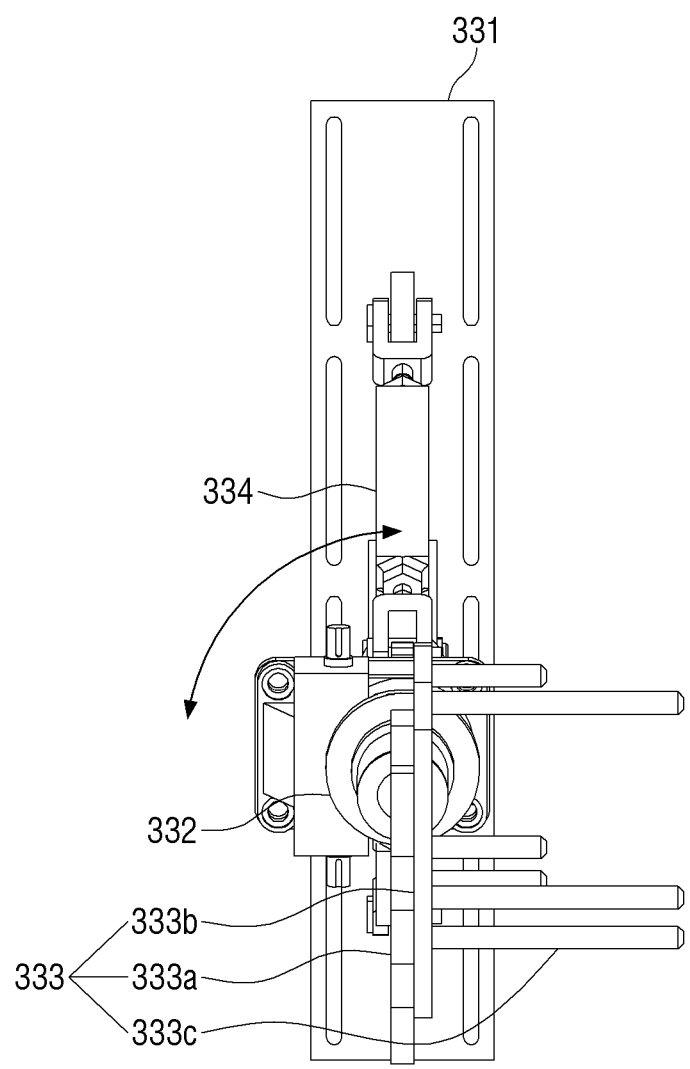
FIG. 21 is a first view for describing operation of the side supporting unit.
Figure 22:
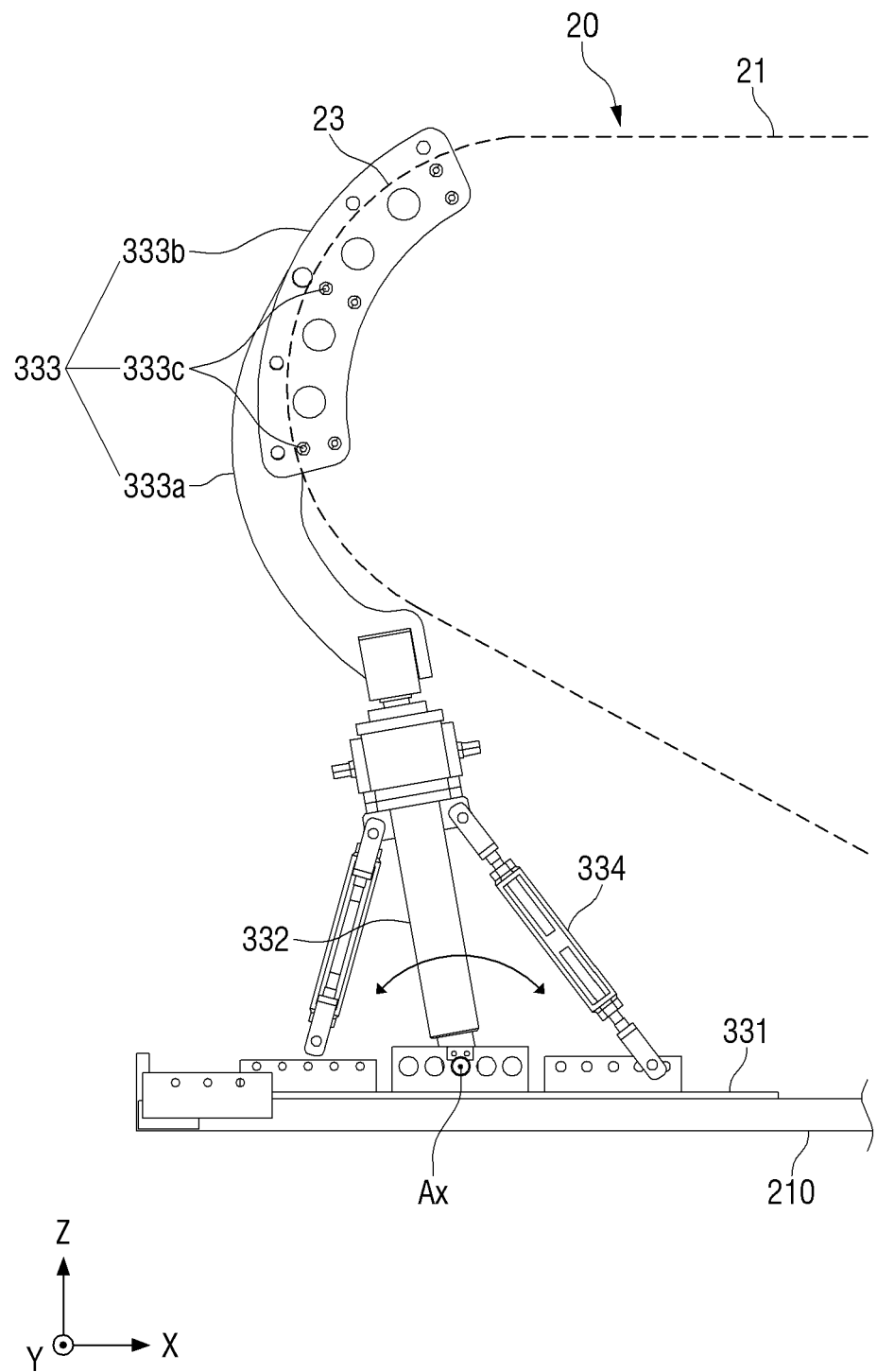
FIG. 22 is a second view for describing operation of the side supporting unit.

FIGS. 21 and 22 are views for describing the operation of the side supporting unit.

Referring to FIG. 21, the tension unit 333 may rotate with respect to the posture adjusting unit 332.

To bring the tension unit 333 into close contact with the caterpillar 20 or remove the tension unit 333 from the caterpillar 20, the user can rotate the tension unit 333 with respect to the posture adjusting unit 332.

Referring to FIG. 22, the plurality of the tension rod 333c may be arranged on the first tension body 333a and the second tension body 333b with a predetermined curvature to correspond to the shape of the side portion of the caterpillar 20.

As the plurality of the tension rod 333c are arranged on the tension bodies to correspond to the shape of the caterpillar 20, it becomes possible for the side supporting unit 330 to support the caterpillar 20 to maintain the shape of the caterpillar 20 installed on the vehicle.

Further, the posture adjusting unit 332 may adjust the posture with respect to the coupling unit 331. As the posture of the posture adjusting unit 332 with respect to the coupling unit 331 is adjusted, the tension unit 333 may move in the longitudinal direction of the caterpillar 20. For example, in a state, in which two of the caterpillar side portion 23 of the caterpillar 20 are supported on two tension units 333 provided in the caterpillar changing apparatus 10, both tension units 333 may move outward of the caterpillar 20. In this case, tension is applied to the caterpillar 20 so that the caterpillar upper portion 21 can maintain a parallel state. When the user wants to install the caterpillar 20 on the vehicle or separate the caterpillar 20 from the vehicle, the user may move the tension units 333 on both sides to the outside of the caterpillar 20 so that the caterpillar upper portion 21 remains in a parallel state.

Figure 23:
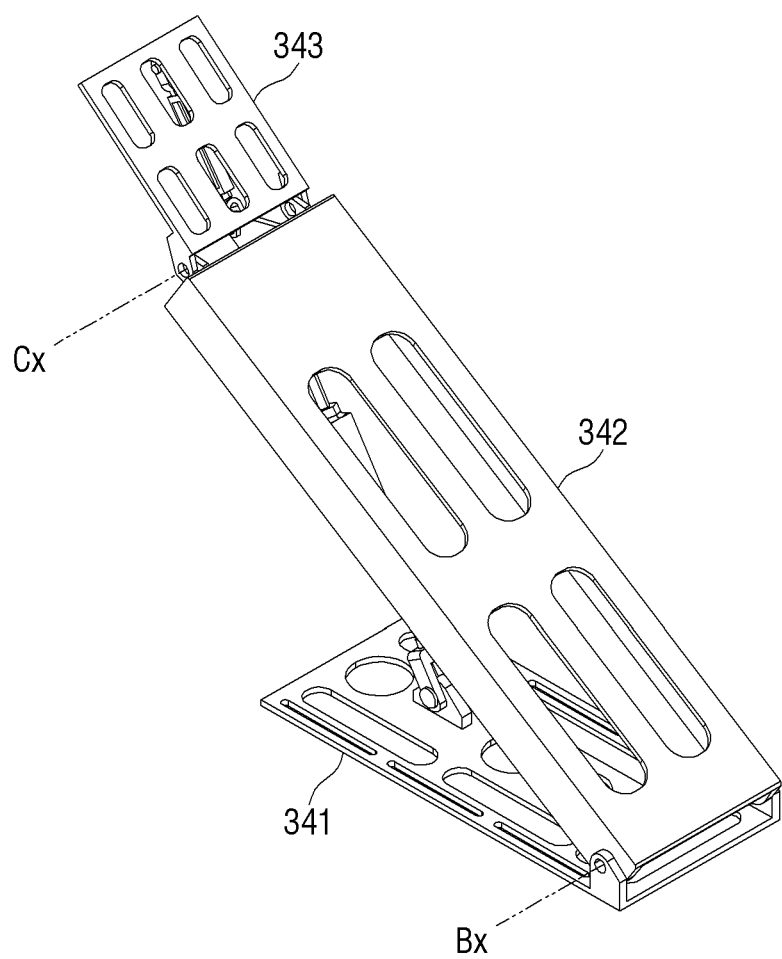
FIG. 23 is a first perspective view of an inclined supporting unit according to an embodiment of the present disclosure.
Figure 24:
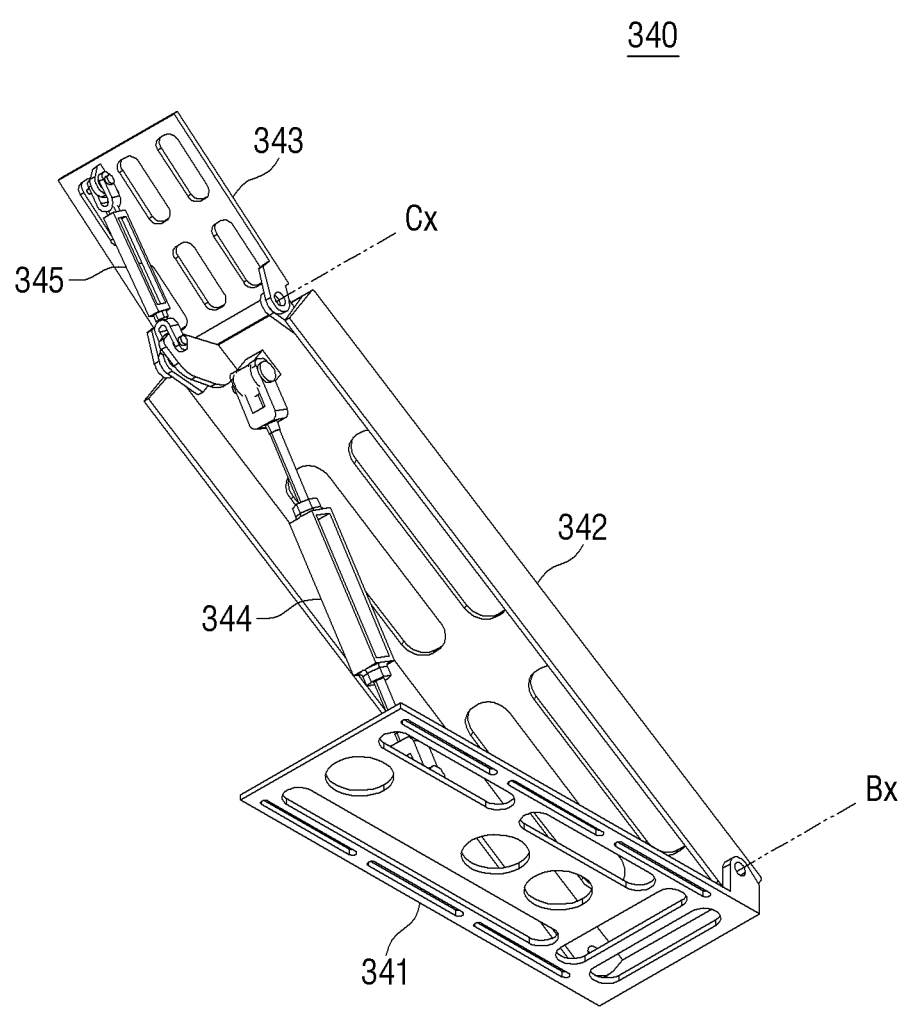
FIG. 24 is a second perspective view of the inclined supporting unit according to the embodiment of the present disclosure.
Figure 25:
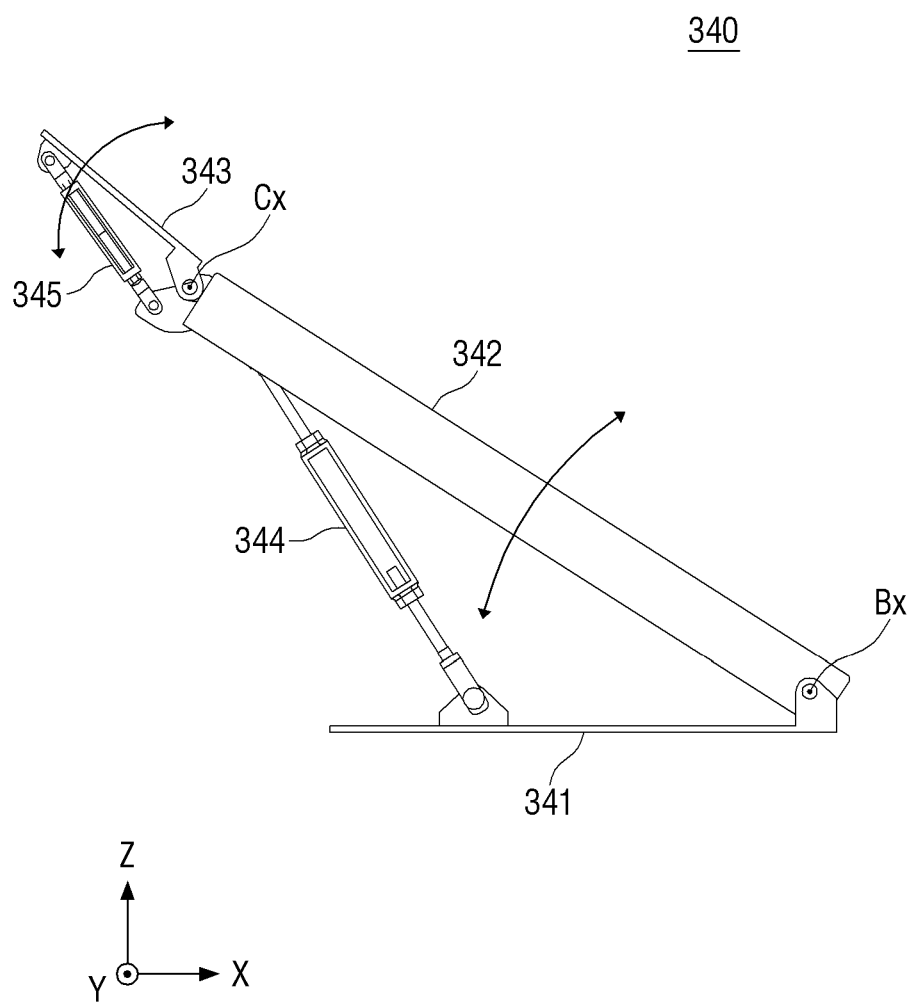
FIG. 25 is a view for describing operation of the inclined supporting unit.

FIGS. 23 and 24 are views for describing the inclined supporting unit, and FIG. 25 is a view for describing the operation of the inclined supporting unit.

Referring to FIGS. 23 and 24, the inclined supporting unit 340 includes a coupling unit 341, a main posture adjusting unit 342, and a sub posture adjusting unit 343.

The coupling unit 341 may be coupled to the moving frame 200. Specifically, the coupling unit 341 may be coupled to the wing frame 230 of the moving frame 200. The user may couple the coupling unit 341 to an appropriate position of the wing frame 230 in consideration of the shape of the caterpillar 20.

The main posture adjusting unit 342 is coupled to the coupling unit 341 to enable the posture adjustment, and may support the caterpillar inclined portion 24 of the caterpillar 20. For example, the main posture adjusting unit 342 may be rotatably coupled to the coupling unit 341. The main posture adjusting unit 342 may rotate with respect to the coupling unit 341 based on the rotation shaft (Bx) so that the posture with respect to the coupling unit 341 may be adjusted.

In order to fix the posture of the main posture adjusting unit 342 with respect to the coupling unit 341, a posture fixing means 344 may be provided between the coupling unit 341 and the main posture adjusting unit 342. For example, the posture fixing means 344 may be a turnbuckle, but the posture fixing means 344 of the present disclosure is not limited to the turnbuckle.

The sub posture adjusting unit 343 is coupled to the main posture adjusting unit 342 to enable the posture adjustment, and may support the caterpillar inclined portion 24 of the caterpillar 20. For example, the sub posture adjusting unit 343 may be rotatably coupled to the main posture adjusting unit 342. The sub posture adjusting unit 343 may rotate with respect to the main posture adjusting unit 342 based on the rotation axis (Cx) so that the posture with respect to the main posture adjusting unit 342 may be adjusted.

In order to fix the posture of the sub posture adjusting unit 343 with respect to the main posture adjusting unit 342, a posture fixing means 345 may be provided between the main posture adjusting unit 342 and the sub posture adjusting unit 343. For example, the posture fixing means 345 may be a turnbuckle, but the posture fixing means 345 of the present disclosure is not limited to the turnbuckle.

The main posture adjusting unit 342 and the sub posture adjusting unit 343 may support different portions of the caterpillar 20. That is, the main posture adjusting unit 342 may support a lower portion of the caterpillar inclined portion 24 of the caterpillar 20, and the sub posture adjusting unit 343 may support an upper portion of the caterpillar inclined portion 24. As the posture of the main posture adjusting unit 342 with respect to the coupling unit 341 is adjusted, and the posture of the sub posture adjusting unit 343 with respect to the main posture adjusting unit 342 is adjusted, it becomes possible for the inclined supporting unit 340 to support the caterpillar 20 so that the shape of the caterpillar 20 installed on the vehicle is maintained.

Hereinafter, with reference to FIGS. 26 to 31, it will be described how the caterpillar 20 is changed in the vehicle.

Figure 26:
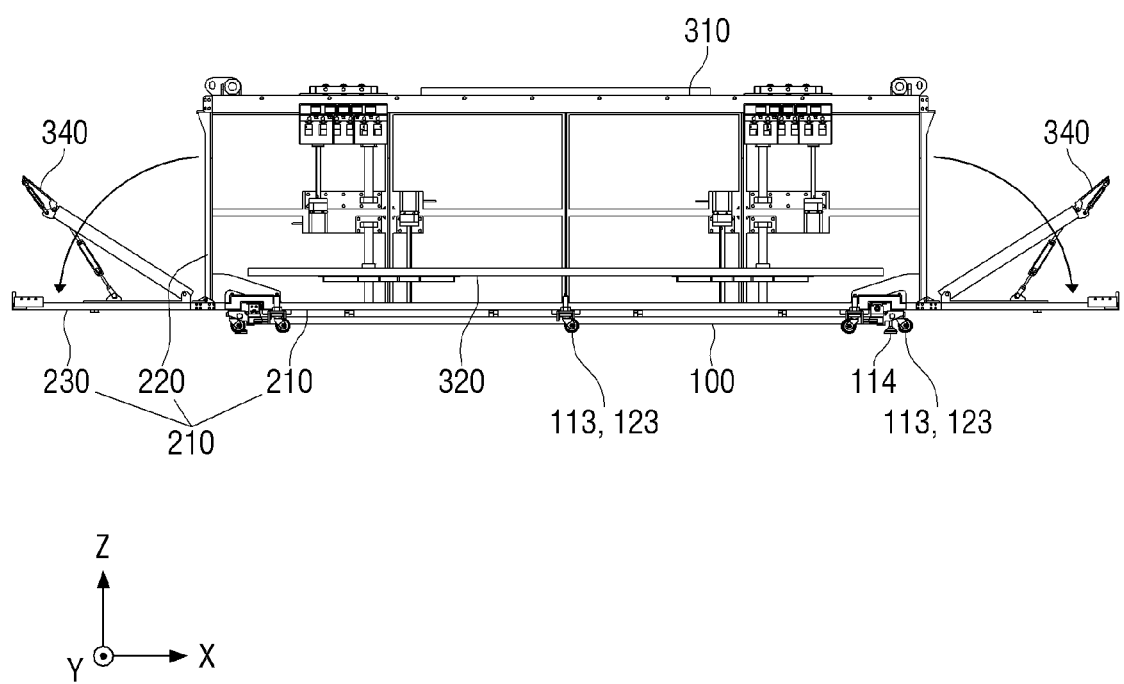
FIG. 26 is a view for describing that a wing frame is unfolded.
Figure 27:
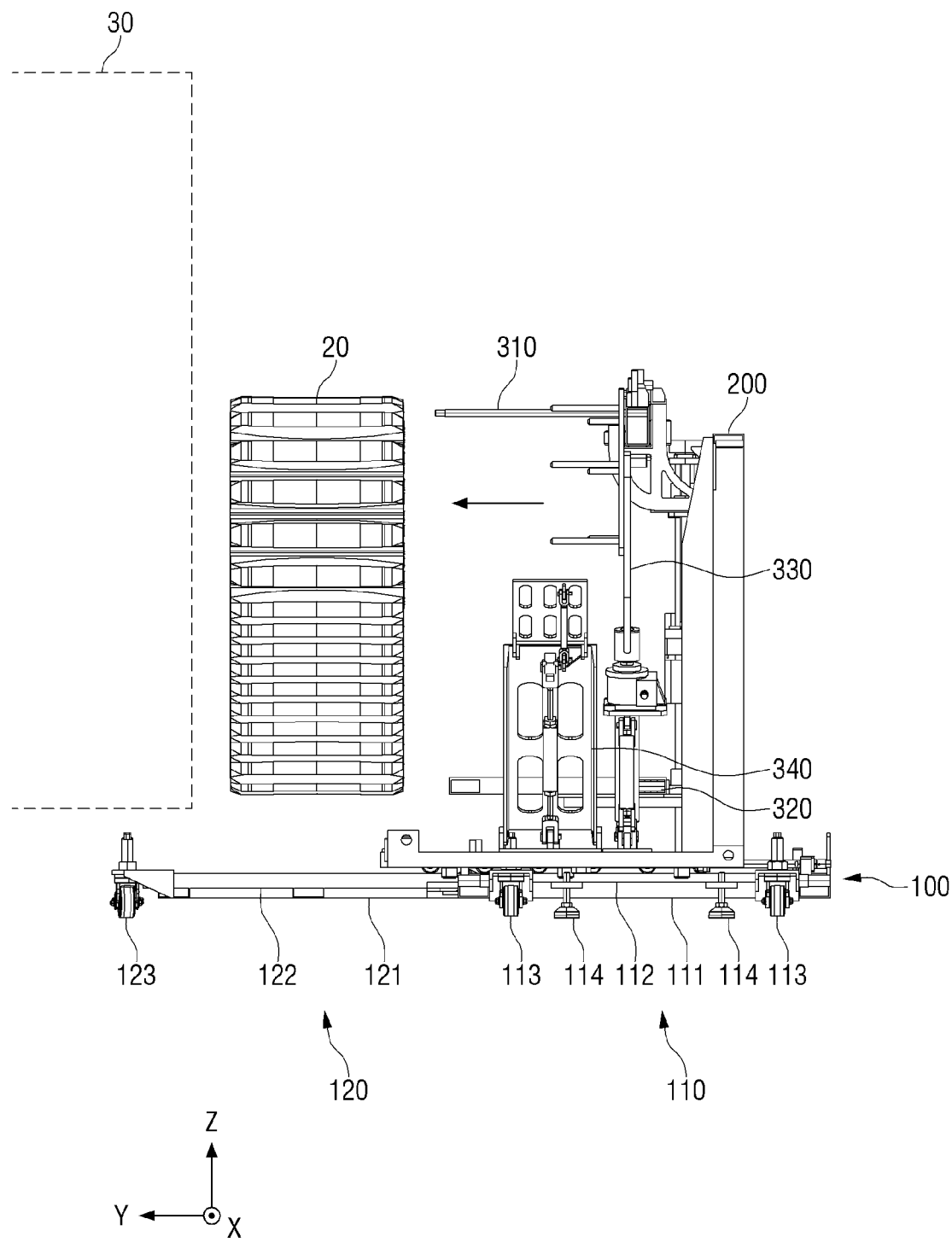
FIG. 27 is a first view for describing movement of the moving frame to the position of the caterpillar.
Figure 28:
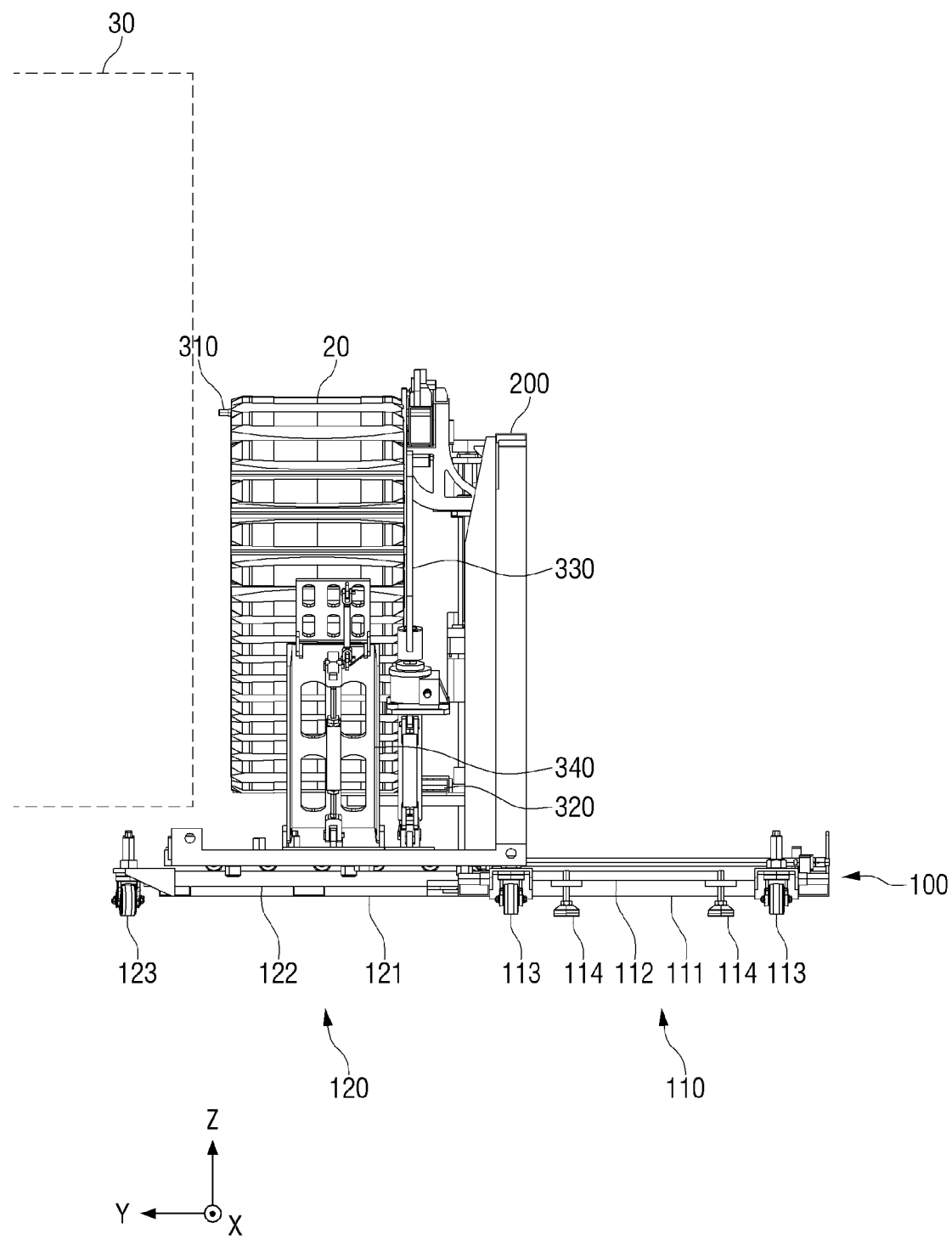
FIG. 28 is a second view for describing the movement of the moving frame to the position of the caterpillar.
Figure 29:
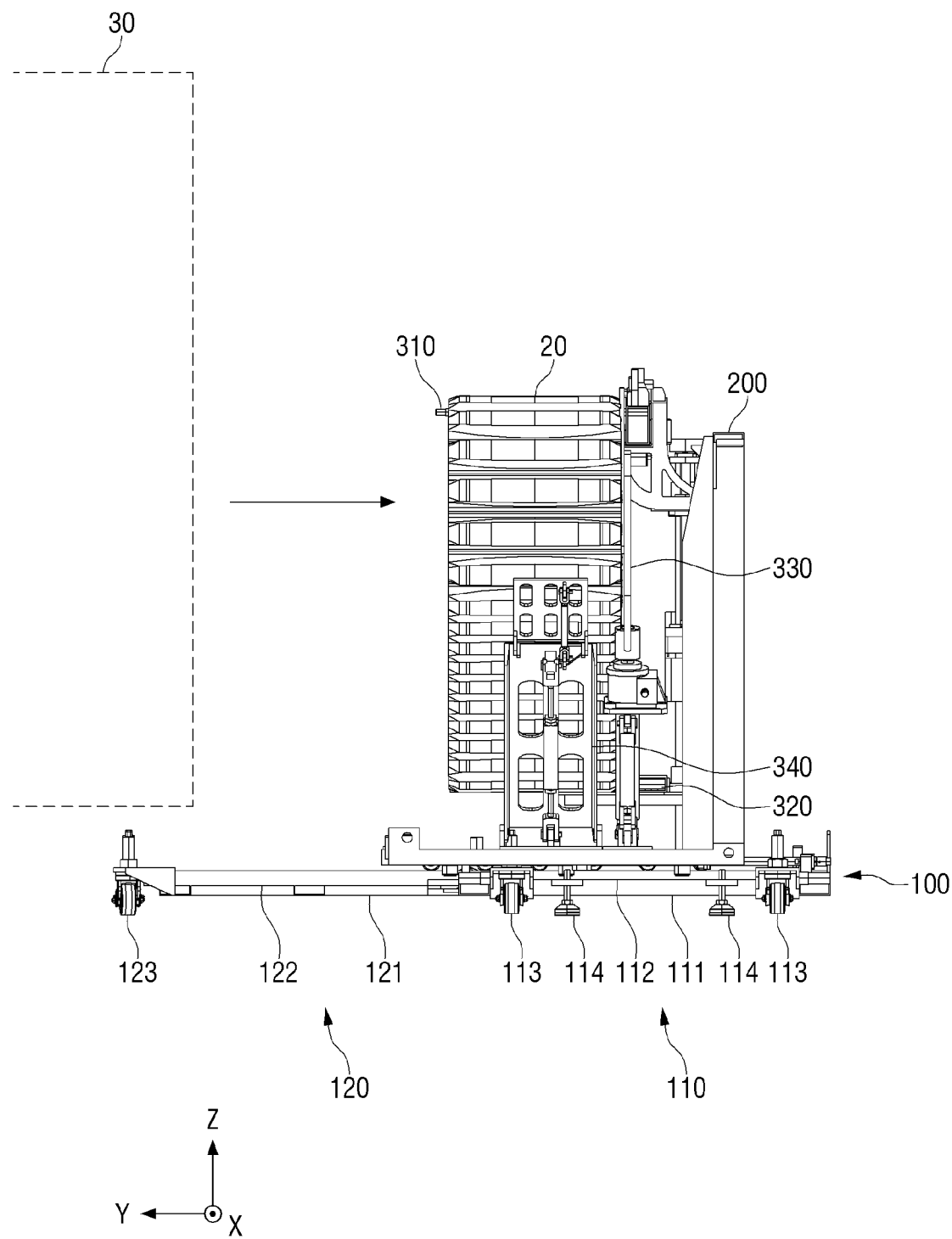
FIG. 29 is a view for describing movement of the caterpillar by the moving frame.
Figure 30:
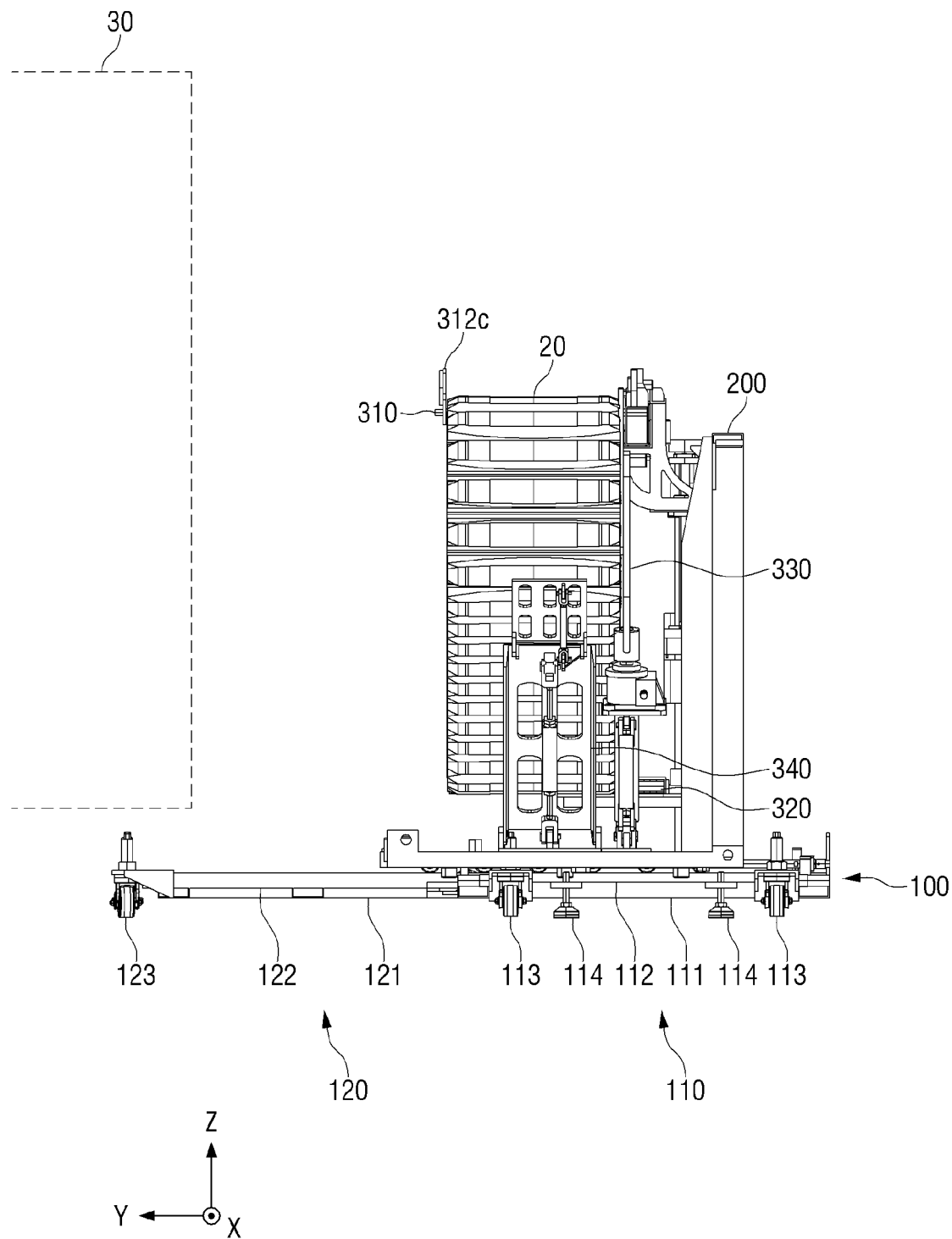
FIG. 30 is a view for describing that a separation preventing unit is installed on a sub supporting unit.
Figure 31:
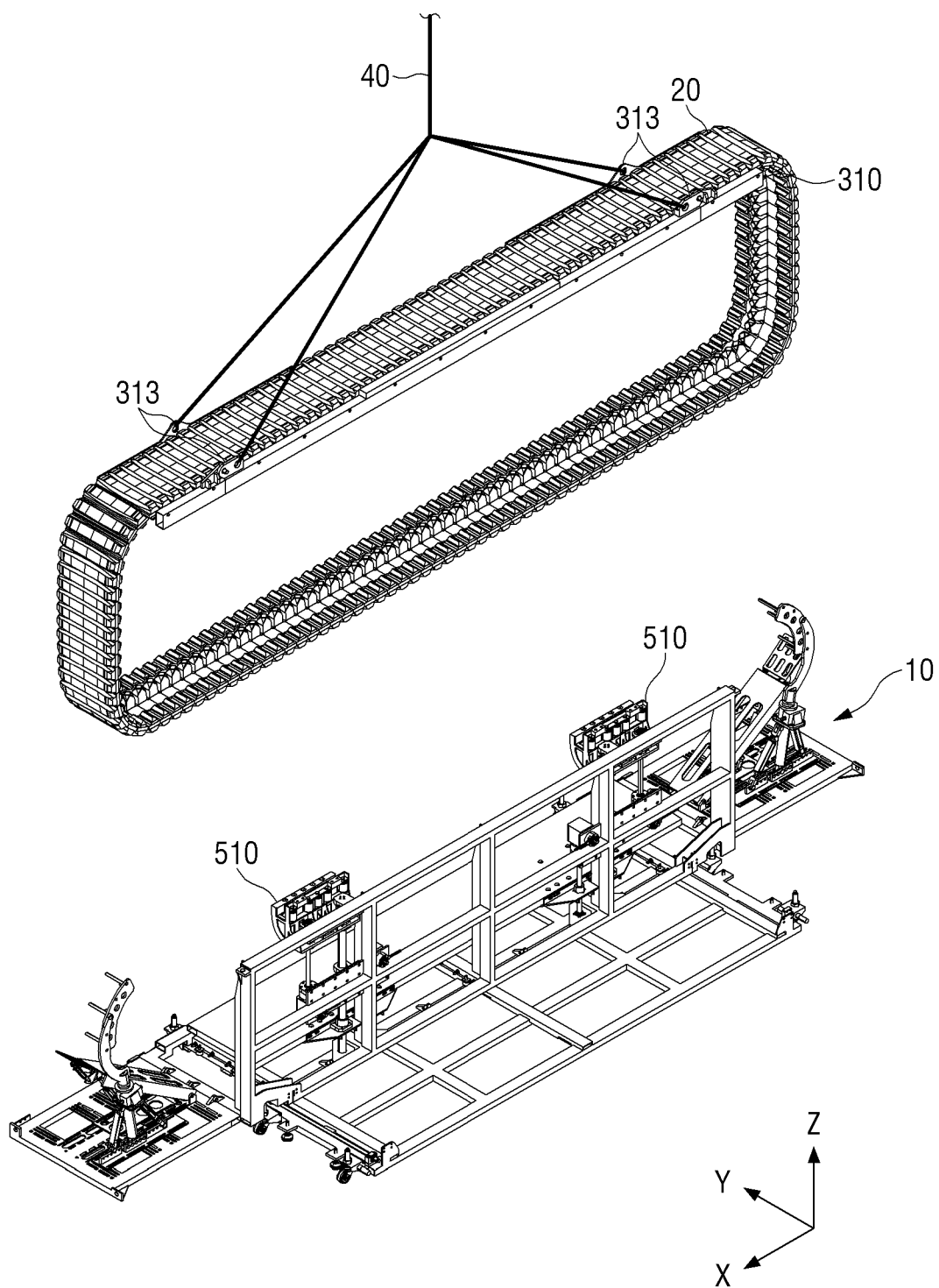
FIG. 31 is a view for describing that the caterpillar is lifted.

FIG. 26 is a view for describing that the wing frame 230 is unfolded, FIGS. 27 and 28 are views for describing the movement of the moving frame 200 to the position of the caterpillar 20, and FIG. 29 is a view for describing the movement of the caterpillar 20 by the moving frame 200, FIG. 30 is a view for describing that the separation preventing unit 312c is installed on the sub supporting unit 312, and FIG. 31 is a view for describing that the caterpillar 20 is lifted.

Referring to FIG. 26, in order to change the caterpillar 20 in a vehicle, the wing frame 230 provided in the caterpillar changing apparatus 10 may be unfolded.

As the wing frame 230 is unfolded, the inclined supporting unit 340 may be exposed to the outside. When the wing frame 230 is folded, the tension unit 333 may not be coupled to the wing frame 230. The tension unit 333 may be coupled to the wing frame 230 after the wing frame 230 is unfolded.

Further, when the wing frame 230 is folded, the sub supporting unit 312 may not be coupled to the main supporting unit 311. The sub supporting unit 312 may be coupled to the main supporting unit 311 after the wing frame 230 is unfolded. In this case, the sub supporting unit 312 may be coupled to the main supporting unit 311 with the separation preventing unit 312c removed.

Before the wing frame 230 is unfolded, the user may move the caterpillar changing apparatus 10 to be close to the vehicle and fix it to the ground. Casters 113 and 123 provided on the floor frame 100 are used for the movement of the caterpillar changing apparatus 10, and the fixing unit 114 may be used to fix the caterpillar changing apparatus 10.

Referring to FIGS. 27 and 28, the moving frame 200 may move with respect to the floor frame 100 to the position of the caterpillar 20.

Before moving the moving frame 200 to the position of the caterpillar 20, the user may adjust the position and posture of the upper supporting unit 310, the lower supporting unit 320, the side supporting unit 330, and the inclined supporting unit 340 according to the shape of the caterpillar 20 installed on the vehicle 30.

The upper supporting unit 310, the lower supporting unit 320, the side supporting unit 330, and the inclined supporting unit 340, having an appropriate position and posture, are close to the caterpillar 20 so that the caterpillar 20 can be supported by the upper supporting unit 310, the lower supporting unit 320, the side supporting unit 330, and the inclined supporting unit 340.

Referring to FIG. 29, the moving frame 200 supporting the caterpillar 20 may move with respect to the floor frame 100.

As the moving frame 200 supporting the caterpillar 20 moves in a direction away from the vehicle 30, the caterpillar 20 may be separated from the vehicle 30.

Referring to FIG. 30, a separation preventing unit 312c may be installed on the sub supporting unit 312.

As the separation preventing unit 312c is installed on the sub supporting unit 312, it can be prevented that the caterpillar 20 is separated from the upper supporting unit 310.

Referring to FIG. 31, the caterpillar 20 supported by the upper supporting unit 310 may be lifted.

The upper supporting unit 310 may be provided with a lug 313 capable of connecting a hook or wire 40. A hook or wire 40 provided in a transport equipment (not shown) such as a crane is coupled to the lug 313, and the transport equipment pulls up the upper supporting unit 310 so that the caterpillar 20 can be lifted together with the upper supporting unit 310.

In order to lift the upper supporting unit 310, the separation preventing body 540 may be removed from the moving body 510 of the moving supporting unit 500. As the separation preventing body 540 is removed from the moving body 510, the upper portion of the main bar 311a is exposed to the outside, and it is possible to separate the upper supporting unit 310 from the moving body 510.

The lifted caterpillar 20 may be seated on the surrounding ground or stored in a separate storage location.

Installing a new one of the caterpillar 20 on the vehicle 30 may be performed by performing the operations of FIGS. 26 to 31 in the reverse order.

Although non-limiting example embodiments of the present disclosure have been described with reference to the above and the accompanying drawings, those of ordinary skill in the art, to which the present disclosure pertains, can understand that embodiments of the present disclosure may be implemented in other specific forms without changing the technical spirit or essential features. Therefore, it should be understood that the embodiments described above are illustrative and non-limiting in all respects.

What is claimed is:

1. A caterpillar changing apparatus comprising:
   a floor frame;
   a moving frame movable with respect to the floor frame; and
   a supporting unit comprising at least one body, the supporting unit provided on the moving frame and configured to support a caterpillar to maintain a shape of the caterpillar that the caterpillar has when installed on a vehicle,
   wherein the at least one body of the supporting unit comprises:
      an upper supporting unit configured to support an upper portion of the caterpillar;
      a lower supporting unit configured to support a lower portion of the caterpillar; and
      a side supporting unit configured to support a side portion of the caterpillar, and
   wherein the upper supporting unit comprises:
      a main supporting unit; and
      a sub supporting unit couplable or detachably coupled to the main supporting unit in a longitudinal direction of the main supporting unit.

2. The caterpillar changing apparatus of claim 1, wherein the floor frame comprises:
   a first floor frame comprising a first rail providing a moving path of the moving frame; and
   a second floor frame detachable from the first floor frame and comprising a second rail connected to the first rail to provide the moving path of the moving frame.

3. The caterpillar changing apparatus of claim 1, wherein the floor frame comprises:
   a body frame;
   a caster provided on the body frame, the caster configured to reduce friction between a ground and the body frame; and
   a fixing unit comprising at least one body, the fixing unit configured to fix the body frame to the ground.

4. The caterpillar changing apparatus of claim 1, wherein the moving frame comprises:
   a base frame movably coupled with respect to the floor frame such as to be configured to move in a moving direction;
   an extension frame extending from the base frame in a direction different from the moving direction of the base frame; and
   two wing frames rotatably coupled to two opposite side surfaces of the base frame, respectively.

5. The caterpillar changing apparatus of claim 4, wherein the base frame comprises a base roller that is configured to reduce friction with the floor frame.

6. The caterpillar changing apparatus of claim 1, wherein the main supporting unit comprises:
   a main bar elongated in a longitudinal direction of the caterpillar; and
   a plurality of main rods elongated in a same direction as each other, provided at different points of the main bar, and configured to support the upper portion of the caterpillar.

7. The caterpillar changing apparatus of claim 1, wherein the upper supporting unit is coupled to the moving frame so as to be movable in a vertical direction with respect to a ground.

8. The caterpillar changing apparatus of claim 1, wherein the upper supporting unit is coupled to the moving frame so as to be movable in a longitudinal direction of the caterpillar.

9. The caterpillar changing apparatus of claim 1, wherein the lower supporting unit is coupled to the moving frame so as to be movable in a vertical direction with respect to a ground.

10. The caterpillar changing apparatus of claim 1, wherein the at least one body of the supporting unit comprises an inclined supporting unit that is configured to support an inclined portion of the caterpillar.

11. A caterpillar changing apparatus comprising:
a floor frame;
a moving frame movable with respect to the floor frame; and
a supporting unit comprising at least one body, the supporting unit provided on the moving frame and configured to support a caterpillar to maintain a shape of the caterpillar that the caterpillar has when installed on a vehicle,
wherein the at least one body of the supporting unit comprises:
an upper supporting unit configured to support an upper portion of the caterpillar;
a lower supporting unit configured to support a lower portion of the caterpillar; and
a side supporting unit configured to support a side portion of the caterpillar, and
wherein the side supporting unit comprises:
a coupling unit coupled to the moving frame;
a posture adjusting unit coupled to the coupling unit and configured to enable posture adjustment of the side supporting unit; and
a tension unit provided with the posture adjusting unit and configured to apply pressure to the side portion of the caterpillar in a longitudinal direction of the caterpillar.

12. The caterpillar changing apparatus of claim 11, wherein the tension unit comprises:
a tension body coupled to the posture adjusting unit; and
a plurality of tension rods elongated in a same direction as each other, provided at different points of the tension body, and configured to apply the pressure to the side portion of the caterpillar.

13. The caterpillar changing apparatus of claim 12, wherein the plurality of tension rods are arranged on the tension body with a predetermined curvature so as to correspond to a shape of the side portion of the caterpillar.

14. The caterpillar changing apparatus of claim 11, wherein the tension unit is rotatably coupled to the posture adjusting unit.

15. A caterpillar changing apparatus comprising:
a floor frame;
a moving frame movable with respect to the floor frame; and
a supporting unit comprising at least one body, the supporting unit provided on the moving frame and configured to support a caterpillar to maintain a shape of the caterpillar that the caterpillar has when installed on a vehicle,
wherein the at least one body of the supporting unit comprises an inclined supporting unit that is configured to support an inclined portion of the caterpillar, and
wherein the inclined supporting unit comprises:
a coupling unit coupled to the moving frame; and
a main posture adjusting unit coupled to the coupling unit and configured to enable posture adjustment of the inclined supporting unit and support the inclined portion of the caterpillar.

16. The caterpillar changing apparatus of claim 15, wherein
the main posture adjusting unit is coupled to the coupling unit such as to enable the posture adjustment, and
the inclined supporting unit further comprises a sub posture adjusting unit that is configured to support the inclined portion of the caterpillar.

17. A caterpillar changing apparatus comprising:
a floor frame;
a moving frame movable with respect to the floor frame; and
a supporting unit comprising at least one body, the supporting unit provided on the moving frame and configured to support a caterpillar to maintain a shape of the caterpillar that the caterpillar has when installed on a vehicle,
wherein the at least one body of the supporting unit comprises:
an upper supporting unit configured to support an upper portion of the caterpillar;
a lower supporting unit configured to support a lower portion of the caterpillar; and
a side supporting unit configured to support a side portion of the caterpillar, and
wherein the upper supporting unit is detachable from the moving frame, or the upper supporting unit comprises a lug that is configured to be connected to a hook or a wire.

18. The caterpillar changing apparatus of claim 17, wherein the upper supporting unit comprises the lug that is configured to be connected to the hook or the wire.

19. The caterpillar changing apparatus of claim 17, wherein the upper supporting unit is detachable from the moving frame.

\* \* \* \* \*